United States Patent
Xu et al.

(10) Patent No.: US 12,417,567 B2
(45) Date of Patent: Sep. 16, 2025

(54) METHOD FOR GENERATING SIGNED DISTANCE FIELD IMAGE, METHOD FOR GENERATING TEXT EFFECT IMAGE, DEVICE AND MEDIUM

(71) Applicant: BEIJING ZITIAO NETWORK TECHNOLOGY CO., LTD., Beijing (CN)

(72) Inventors: Liyou Xu, Beijing (CN); Chenxiang Zhao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 193 days.

(21) Appl. No.: 18/357,651

(22) Filed: Jul. 24, 2023

(65) Prior Publication Data
US 2024/0005573 A1 Jan. 4, 2024

Related U.S. Application Data

(63) Continuation-in-part of application No. PCT/CN2021/133879, filed on Nov. 29, 2021, and a
(Continued)

(30) Foreign Application Priority Data

Jan. 28, 2021 (CN) .......................... 202110118987.7
Jan. 28, 2021 (CN) .......................... 202110118989.6
(Continued)

(51) Int. Cl.
*G06T 11/20* (2006.01)
*G06T 7/90* (2017.01)
(Continued)

(52) U.S. Cl.
CPC .............. *G06T 11/203* (2013.01); *G06T 7/90* (2017.01); *G06V 10/56* (2022.01); *G06V 10/751* (2022.01); *G06T 2207/10024* (2013.01)

(58) Field of Classification Search
CPC ......... G06T 11/203; G06T 11/60; G06T 7/90; G06T 2207/10024; G06V 10/56;
(Continued)

(56) References Cited

U.S. PATENT DOCUMENTS

| 2004/0189644 A1 | 9/2004 | Frisken et al. |
| 2004/0189655 A1 | 9/2004 | Perry et al. |

(Continued)

FOREIGN PATENT DOCUMENTS

| CN | 1998023 A | 7/2007 |
| CN | 101046881 A | 10/2007 |

(Continued)

OTHER PUBLICATIONS

Green, Chris. "Improved alpha-tested magnification for vector textures and special effects." ACM SIGGRAPH 2007 courses. 2007. 9-18. (Year: 2007).*

(Continued)

*Primary Examiner* — Alicia M Harrington
*Assistant Examiner* — Brianna Renae Cochran
(74) *Attorney, Agent, or Firm* — Astute IP Law Group

(57) ABSTRACT

A method for generating a signed distance field image, methods for processing a text effect, a device and a medium are provided. The method for generating a signed distance field image includes: determining a target closed curve in an unsigned distance field image of target text, drawing a target triangle; counting for pixels within the target triangle; determining that pixels having counting results equal to 0 in the unsigned distance field image are located in an interior region of the target text, and determining that pixels having
(Continued)

counting results not equal to 0 in the unsigned distance field image are located in the exterior region; and generating a signed distance field image of the target text based on the pixels located in the exterior region, the pixels located in the interior region, and the unsigned distance field image.

20 Claims, 15 Drawing Sheets

Related U.S. Application Data continuation-in-part of application No. PCT/CN2021/135953, filed on Dec. 7, 2021, and a continuation-in-part of application No. PCT/CN2022/072915, filed on Jan. 20, 2022, and a continuation-in-part of application No. PCT/CN2021/133880, filed on Nov. 29, 2021, and a continuation-in-part of application No. PCT/CN2022/072916, filed on Jan. 20, 2022, and a continuation-in-part of application No. PCT/CN2021/135952, filed on Dec. 7, 2021.

(30) Foreign Application Priority Data

| Jan. 28, 2021 | (CN) | 202110121057.7 |
|---|---|---|
| Jan. 28, 2021 | (CN) | 202110121063.2 |
| Jan. 28, 2021 | (CN) | 202110121068.5 |
| Jan. 28, 2021 | (CN) | 202110134319.3 |

(51) Int. Cl.
  *G06V 10/56* (2022.01)
  *G06V 10/75* (2022.01)

(58) Field of Classification Search
  CPC .......... G06V 10/751; G09G 5/24; G09G 5/28; G09G 5/246; G09G 5/22; G09G 5/26
  See application file for complete search history.

(56) References Cited

U.S. PATENT DOCUMENTS

| | | | |
|---|---|---|---|
| 2004/0189663 A1 | 9/2004 | Perry et al. | |
| 2004/0189666 A1 | 9/2004 | Frisken et al. | |
| 2005/0035976 A1* | 2/2005 | Ecob | G06T 15/503 |
| | | | 345/611 |
| 2007/0188498 A1 | 8/2007 | Okada et al. | |
| 2008/0100624 A1 | 5/2008 | Matsunaga | |
| 2010/0189362 A1 | 7/2010 | Jakubiak et al. | |
| 2010/0245387 A1 | 9/2010 | Bachelder et al. | |
| 2013/0174022 A1 | 7/2013 | Xia et al. | |
| 2014/0043339 A1 | 2/2014 | Taylor et al. | |
| 2015/0113372 A1 | 4/2015 | Flider | |
| 2017/0200292 A1* | 7/2017 | Betts | G06T 11/203 |
| 2019/0108657 A1* | 4/2019 | Petersen | G06T 11/001 |
| 2019/0236820 A1* | 8/2019 | Lengyel | G06T 11/203 |
| 2020/0184687 A1 | 6/2020 | Gueniot et al. | |
| 2020/0279415 A1 | 9/2020 | Betts et al. | |
| 2022/0207821 A1 | 6/2022 | Xu et al. | |
| 2023/0082839 A1* | 3/2023 | Petersen | G06T 3/40 |
| | | | 345/441 |

FOREIGN PATENT DOCUMENTS

| CN | 101187983 A | 5/2008 |
|---|---|---|
| CN | 101308572 A | 11/2008 |
| CN | 102208022 A | 10/2011 |
| CN | 102292721 A | 12/2011 |
| CN | 103186506 A | 7/2013 |
| CN | 103824310 A | 5/2014 |
| CN | 105913462 A | 8/2016 |
| CN | 105956498 A | 9/2016 |
| CN | 105957125 A | 9/2016 |
| CN | 106126140 A | 11/2016 |
| CN | 109410300 A | 3/2019 |
| CN | 110443877 A | 11/2019 |
| CN | 110782534 A | 2/2020 |
| CN | 111292405 A | 6/2020 |
| CN | 111311724 A | 6/2020 |
| CN | 111803942 A | 10/2020 |
| CN | 112256367 A | 1/2021 |
| JP | 2002-351440 A | 12/2002 |
| JP | 2015141615 A | 8/2015 |

OTHER PUBLICATIONS

Adamsson, Gustav. "Fast and Approximate Text Rendering Using Distance Fields." (2015). (Year: 2015).*
Lengyel, Eric. "Gpu-centered font rendering directly from glyph outlines." Journal of Computer Graphics Techniques vol. 6.2 (2017). (Year: 2017).*
Blog Post by chriscummingshrg, Title: Signed Distance Fields Part 7: Some Simple Effects. Retrieved from internet URL: https://web.archive.org/web/20190113112353/https://shaderfun.com/2018/07/01/signed-distance-fields-part-7-some-simple-effects/# expand. Jan. 13 2019, 9 Pages (Year: 2019).*
Zhang et al., "Computer Generation of 3D Inscriptions from 2D Images of Chinese Calligraphy", Chinese Journal of Computers, vol. 37, No. 11, pp. 2380-2388, Nov. 15, 2014, with English abstract.
International Search Report and Written Opinion, International Patent Application No. PCT/CN2021/133879, Feb. 21, 2022, with English translation (15 pages).
International Search Report and Written Opinion, International Patent Application No. PCT/CN2021/133880, Feb. 18, 2022, with English translation (15 pages).
International Search Report and Written Opinion, International Patent Application No. PCT/CN2021/135952 Mar. 2, 2022, with English translation (15 pages).
Li, Yanchen, "Study on Signed Distance Field For Soft Shadow Generation", Information & Technology (Master), China Master's Theses Full-text, Database, No. 8, Aug. 15, 2019, with English abstract (75 pages).
Zhang et al., "Application of Photoshop CS layer styles in text effect production", Computer Knowledge and Technology (Experience and Skills), Issue 11, pp. 93-95, Dec. 31, 2007, with English translation.
International Search Report and Written Opinion, International Patent Application No. PCT/CN2021/135953 Feb. 28, 2022, with English translation (14 pages).
International Search Report and Written Opinion, International Patent Application No. PCT/CN2022/072915 Mar. 4, 2022, with English translation (15 pages).
International Search Report and Written Opinion, International Patent Application No. PCT/CN2022/072916 Apr. 26, 2022, with English translation (15 pages).
First Office Action for Chinese Patent Application No. 202110118987.7, mailed on Jan. 25, 2025, 16 pages.
Gypsum: "Interesting Technology SDF (Signed Distance Field) in Unity", Retrieved from the Internet URL: https://www.jianshu.com/p/c466e8b2c854, Feb. 1, 2020, 8 pages.

* cited by examiner

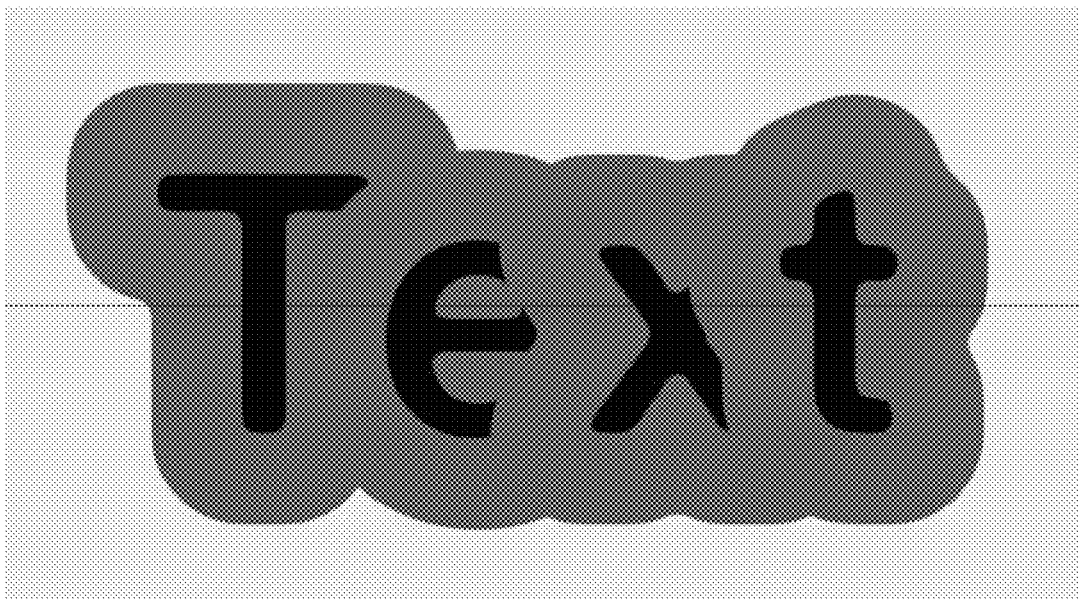

Figure 5

| in response to detecting that there is a pixel, in the signed distance field image of the target text, having the same position coordinates as a pixel in an image already drawn on a canvas, compare a distance field value of the pixel in the signed distance field image with a distance field value of the pixel in the image already drawn on the canvas | S601 |

↓

| in response to determining, among the pixels having the same position coordinates, that the distance field value of the pixel in the signed distance field image is less than a first value, draw the pixel in the signed distance field image on the canvas | S602 |

↓

| Generate a contour-effect image corresponding to the target text based on pixels in the signed distance field image which are drawn onto the canvas | S603 |

Figure 6

METHOD FOR GENERATING SIGNED DISTANCE FIELD IMAGE, METHOD FOR GENERATING TEXT EFFECT IMAGE, DEVICE AND MEDIUM

This application is a continuation-in-part application of International Application No. PCT/CN2022/072916, titled "METHOD FOR GENERATING SIGNED DISTANCE FIELD IMAGE, METHOD FOR GENERATING TEXT EFFECT IMAGE, DEVICE AND MEDIUM", filed on Jan. 20, 2022, which claims priority to Chinese Patent Application No. 202110121068.5 filed on Jan. 28, 2021 with the China National Intellectual Property Administration.

This application is also a continuation-in-part application of International Application No. PCT/CN2022/072915, titled "TEXT CONTOUR EFFECT PROCESSING METHOD AND APPARATUS, DEVICE, AND STORAGE MEDIUM", filed on Jan. 20, 2022, which claims priority to Chinese Patent Application No. 202110121057.7 filed on Jan. 28, 2021 with the China National Intellectual Property Administration.

This application is also a continuation-in-part application of International Application No. PCT/CN2021/133880, titled "TEXT ILLUMINATION EFFECT PROCESSING METHOD, APPARATUS, DEVICE, AND STORAGE MEDIUM", filed on Nov. 29, 2021, which claims priority to Chinese Patent Application No. 202110121063.2 filed on Jan. 28, 2021 with the China National Intellectual Property Administration.

This application is also a continuation-in-part application of International Application No. PCT/CN2021/133879, titled "EFFECT PROCESSING METHOD AND APPARATUS, AND DEVICE AND STORAGE MEDIUM", filed on Nov. 29, 2021, which claims priority to Chinese Patent Application No. 202110118987.7 filed on Jan. 28, 2021 with the China National Intellectual Property Administration.

This application is also a continuation-in-part application of International Application No. PCT/CN2021/135953, titled "TEXT SHADOW EFFECT PROCESSING METHOD AND APPARATUS, DEVICE AND STORAGE MEDIUM", filed on Dec. 7, 2021, which claims priority to Chinese Patent Application No. 202110118989.6 filed on Jan. 28, 2021 with the China National Intellectual Property Administration.

This application is also a continuation-in-part application of International Application No. PCT/CN2021/135952, titled "GRADIENT COLOR EFFECT PROCESSING METHOD AND APPARATUS, AND DEVICE AND STORAGE MEDIUM", filed on Dec. 7, 2021, which claims priority to Chinese Patent Application No. 202110134319.3 filed on Jan. 28, 2021 with the China National Intellectual Property Administration.

All of these applications are incorporated herein by reference in their entireties.

FIELD

The present disclosure relates to the field of data processing, and in particular to a method and an apparatus for generating a signed distance field image, a method and a system for generating a text effect image, a device, a storage medium, and a computer program product.

BACKGROUND

Distance field images are not distorted at a large scaling ratio compared with normal bitmap text. Therefore, the distance field images are more suitable for processing text effects.

A distance field image of text records a minimum distance from each of pixels inside and outside the text to a contour (also referred to as a boundary) of the text, where the minimum distance is also referred to as a distance field value. In a signed distance field image, distance field values of pixels inside the text are set to negative numbers, and distance field values of pixels outside the text are set to positive numbers.

A method for generating a signed distance field image of text is implemented by using rendering pipelines of OpenGL. The method includes a line-drawing phase, a shape-drawing phase, and a color reverse and signed transformation phase for the distance field image. During the line-drawing phase, an unsigned distance field image of text is drawn. During the shape-drawing phase, it is to determine whether each of pixels in the unsigned distance field image is located in an interior region of the text or an exterior region of the text. During the color reverse and signed transformation phase, based on the determined position information that each of pixels is located in the interior region or the exterior region, color reverse processing is performed, in the unsigned distance field image, for pixels located in the interior region of the text. Finally, the signed distance field image of the text is obtained.

Specifically, in the shape-drawing phase, triangles are drawn by taking adjacent sample points on closed curves in the unsigned distance field image and an origin as vertices, and accumulative counting is performed for pixels within the triangles to obtain accumulative counting results for pixels in the unsigned field image. For each of the pixels in the unsigned field image, it is determined whether an accumulative counting result of the pixel is an odd number or an even number, to determine whether the pixel is located in the interior region of the text or the exterior region of the text, so as to generate the signed distance field image.

However, for text including multiple closed curves overlap at overlapping regions, the scheme of determining whether a pixel is located in the interior region of the text or the exterior region of the text based on parity of the accumulative counting result of the pixel in the shape-drawing phase may incur inaccurate position information of the pixel. Reference is made to FIG. 1, which is a schematic diagram of an unsigned field image for text "+". For a pixel within the overlapping region of the text "+", the accumulative counting result determined in the above counting manner is 2. Since 2 is an even number, the pixel in the overlapping region is mistakenly determined as located in the exterior region of the text, resulting in an inaccurate signed distance field image that is finally generated.

In addition, text-effect drawing is applied to various fields, such as scene rendering for online games, subtitle display for variety shows, and text display for videos, which requires a better text effect.

SUMMARY

In order to solve the above technical problem or at least partially solve the above technical problem, a method and an apparatus for generating a signed distance field image, a method and a system for generating a text effect image, a device, a storage medium, and a computer program product are provided according to the embodiments of the present disclosure, to accurately generate a signed distance field image of text including multiple closed curves overlap with each other.

In a first aspect, a method for generating a signed distance field image is provided according to an embodiment of the present disclosure. The method includes: determining a target closed curve in an unsigned distance field image of target text, and determining an origin corresponding to the target closed curve; drawing a target triangle by taking two adjacent sample points on the target closed curve and the origin as vertices according to a sampling order of the adjacent sample points, where the sampling order is a preset direction along the target closed curve; performing counting for pixels within the target triangle based on a drawing direction of the target triangle, where the drawing direction of the target triangle is a clockwise direction or a counterclockwise direction, a counting manner in a case where the drawing direction is the clockwise direction is inverse to a counting manner in a case where the drawing direction is the counterclockwise direction, and the counting manners include increment by N per count or decrement by N per count, and N is a nonzero number; determining that pixels having counting results equal to 0 in the unsigned distance field image are located in an interior region of the target text, and determining that pixels having counting results not equal to 0 in the unsigned distance field image are located in the exterior region of the target text; and generating a signed distance field image of the target text based on the pixels located in the exterior region of the target text, the pixels located in the interior region of the target text, and the unsigned distance field image.

In an embodiment, that a counting manner in a case where the drawing direction is the clockwise direction is inverse to a counting manner in a case where the drawing direction is the counterclockwise direction refers to that: the counting manner for pixels within the target triangle is increment by N per count in a case that the drawing direction is a clockwise direction, and the counting manner for pixels within the target triangle is decrement by N per count in a case that the drawing direction is a counterclockwise direction; or the counting manner for pixels within the target triangle is decrement by N per count in a case that the drawing direction is a clockwise direction, and the counting manner for pixels within the target triangle is increment by N per count in a case that the drawing direction is a Counterclockwise direction.

In an embodiment, the method further includes: for each of pixels in the signed distance field image, splitting a distance field value corresponding to the pixel into four 8-bit unsigned integers; and storing the four 8-bit unsigned integers by using four color channels of RGBA respectively.

In an embodiment, the splitting, for each of pixels in the signed distance field image, a distance field value corresponding to the pixel into four 8-bit unsigned integers includes: multiplying four parts including integer part, [1/256,1], [1/$256^2$, 1/256], and [1/$256^3$, 1/$256^2$] of the distance field value of each pixel in the signed distance field image by 1, 256, 2562, and 2563 respectively, to obtain four 8-bit unsigned integers.

In an embodiment, the method further includes: in response to an application-triggering operation on the signed distance field image, combining values obtained by dividing the four 8-bit unsigned integers by 1, 256, $256^2$, and $256^3$ respectively to obtain a 32-bit floating-point number as the distance field value of the pixel.

In an embodiment, before an undirected distance field image of the target text is generated based on vector contour information of the target text, the method further includes: converting a third-order Bezier curve in a target typeface file into a second-order Bezier curve to obtain a converted target typeface file. Accordingly, the undirected distance field image of the target text is generated based on the vector contour information of the target text by: generating the unsigned distance field image of the target text collectively based on the converted target typeface file and vector contour information of the target text.

In an embodiment, the method further includes: buffering the signed distance field image of the target text.

In an embodiment, the signed distance field image of the target text is generated in real time.

In an embodiment, the method further includes: in response to detecting in the signed distance field image of the target text, a pixel having the same position coordinates as a pixel in an image already drawn on a canvas, comparing a distance field value of the pixel in the signed distance field image with a distance field value of the pixel in the image already drawn on the canvas; in response to determining, among the pixels having the same position coordinates, that the distance field value of the pixel in the signed distance field image is less than a first value, drawing the pixel in the signed distance field image onto the canvas; and generating a contour-effect image corresponding to the target text based on pixels in the signed distance field image which are drawn onto the canvas.

In an embodiment, before the pixels in the signed field image are drawn onto the canvas, the method further includes: determining, based on correspondence between color values and distance-field-value ranges, color values corresponding to distance field values of the pixels in the signed field image as color values of the pixels. Accordingly, the pixels in the signed field image are drawn onto the canvas by: drawing, based on the color values of the pixels, the pixels in the signed field image on the canvas.

In an embodiment, before the contour-effect image corresponding to the target text is generated based on the pixels in the signed distance field image which are drawn onto the canvas, the method further includes: determining, for each of pixels having distance field values greater than 0 in the signed distance field image, a gradient value of the pixel based on a dot product of offset coordinates of the pixel with a gradient-direction vector, where the offset coordinate refers to a difference between position coordinates of the pixel and coordinates of a gradient origin, and determining, for each of pixels having distance field values greater than 0 in the signed distance field image, a color value of the pixel based on a gradient value of the pixel and target gradient colors.

In an embodiment, before the contour-effect image corresponding to the target text is generated based on the pixels in the signed distance field image which are drawn onto the canvas, the method further includes: determining, for each of pixels having distance field values less than 0 in the signed distance field image, a color transparency value of the pixel based on a distance field values of the pixel. An absolute value of the distance field value of the pixels is inversely proportional to the color transparency value of the pixel.

In an embodiment, the method further includes: in response to determining, among the pixels having the same position coordinates, that the distance field value of the pixel in the signed distance field image of the target text is greater than a second value, making a mark for the pixel in the signed distance field image, where the mark is used for indicating that the pixel is not to be drawn onto the canvas; determining, in the signed distance field image of the target text, pixels having distance field values within a preset range as target pixels corresponding to the target text; determining color transparency values corresponding to the target pixels based on the distance field values of the target pixels, where for each of the target pixels, an absolute value of a distance field value of the target pixel is inversely proportional to a color transparency value of the target pixel; and drawing a luminous-effect image corresponding to the target text based on the color transparency values corresponding to the target pixels.

In an embodiment, the preset range is determined to be a range greater than 0 and less than a first preset value. The luminous-effect image is an exterior-luminous-effect image for the target text.

In an embodiment, the preset range is determined to be a range greater than a second preset value and less than 0. The luminous-effect image is an interior-luminous-effect image for the target text.

In an embodiment, the preset range is determined to be a range greater than a third preset value and less than a fourth preset value. The third preset value is less than 0, and the fourth preset value is greater than 0. The luminous-effect image is an interior-exterior-luminous-effect image for target text.

In an embodiment, the drawing a luminous-effect image corresponding to the target text based on the color transparency values corresponding to the target pixels includes: in response to detecting in an image already drawn on a canvas, a pixel having the same position coordinates as a target pixel, drawing the target pixel at the position coordinates onto the canvas based on a color transparency value corresponding to the target pixel; and generating a luminous-effect image corresponding to the target text based on drawing of target pixels on the canvas.

In an embodiment, before determining, in the signed distance field image of the target text, pixels having distance field values within the preset range as the target pixels corresponding to the target text, the method further includes: performing Post-processing of Gaussian blur on the signed distance field image of the target text.

In an embodiment, before the luminous-effect image corresponding to the target text is drawn based on the color transparency values corresponding to the target pixels, the method further includes: determining, for each of the target pixels, a dot product of position coordinates of the target pixel with a gradient-direction vector as a gradient value corresponding to the target pixel, where the gradient-direction vector represents a direction of color gradient; and determining, for each of the target pixels, a color value of the target pixel based on a gradient value of the target pixel, target gradient colors, and a target gradient position. Accordingly, the luminous-effect image corresponding to the target text is drawn based on the color transparency values corresponding to the target pixels by: drawing the luminous-effect image corresponding to the target text based on the color values and the color transparency values of the target pixels.

In an embodiment, the determining the color transparency values corresponding to the target pixels based on the distance field values of the target pixels includes: in a case of the distance field value of the target pixel greater than 0, determining a ratio of the distance field value of the target pixel to a preset first luminous radius and determining a difference obtained by subtracting the ratio from 1 as a color transparency value corresponding to the target pixel; and in a case of the distance field value of the target pixel less than 0, determining a ratio of the distance field value of the target pixel to a preset second luminous radius and determining a sum of 1 and the ratio as a color transparency value corresponding to the target pixel.

In an embodiment, the method includes: obtaining a distance field image of a to-be-processed object, and a first effect distance field image; calculating a sum of a distance field value of a pixel in the signed distance field image of the target text and a distance field value of a pixel in the first effect distance field image located at same position coordinates as the pixel in the signed distance field image, and determining the sum as a distance field value of a pixel located at the same position coordinates in a first target distance field image; and drawing a first target effect image for the to-be-processed object based on distance field values of pixels in the first target distance field image.

In an embodiment, the method further includes: obtaining a second effect distance field image, where the first effect distance field image and the second effect distance field image are from a distance-field-image sequence and have different time stamps; calculating a sum of a distance field value of a pixel in the distance field image of the to-be-processed object and a distance field value of a pixel in the second effect distance field image located at same position coordinates as the pixel in the distance field image of the to-be-processed object, and determining the sum as a distance field value of a pixel having the same position coordinates in a second target distance field image; drawing a second target effect image for the to-be-processed object based on distance field values of pixels in the second target distance field image; and generating a sequential effect animation for the to-be-processed object based on the first target effect image and the second target effect image according to a chronological order of the time stamps.

In an embodiment, the distance-field-image sequence with time stamps includes multiple continuous distance-field-image frames generated based on a preset transformation rule. The preset transformation rule includes sine transformation, cosine transformation, or a pulse curve. Alternatively, the distance-field-image sequence includes multiple continuous distance-field-image frames for noise effects.

In an embodiment, the to-be-processed object includes target text.

In an embodiment, the drawing a first target effect image for the to-be-processed object based on distance field values of pixels in the first target distance field image includes: determining pixels, having distance field values less than 0, in the first target distance field image as first target pixels; determining, for each of the first target pixels, a gradient value of the first target pixel based on a dot product of offset coordinates of the first target pixel with a gradient-direction vector, where the offset coordinates represent a difference between position coordinates of the first target pixel and coordinates of a gradient origin; determining color values of the first target pixels based on the gradient values of the first target pixels and target gradient colors; and drawing the first target effect image of the to-be-processed object based on the color values of the first target pixels.

In an embodiment, the drawing a first target effect image for the to-be-processed object based on distance field values of pixels in the first target distance field image includes: determining pixels, having distance field values less than 0, in the first target distance field image as second target pixels; determining color transparency values of the second target pixels based on the distance field values of the second target pixels, where for each of the second target pixels, an absolute value of a distance field value of the second target pixel is inversely proportional to a color transparency value of the second target pixel; and drawing the first target effect image for the to-be-processed object based on the color transparency values of the second target pixels.

In an embodiment, the method further includes: performing position offset on pixels in the signed distance field image of the target text to obtain a first distance field image, where the first distance field image includes original pixels and offset pixels obtained after the original pixels are subjected to position offset; drawing an initial interior-shadow-effect image corresponding to the target text based on the first distance field image; determining a target region composed of offset pixels, in the first distance field image, having distance field values greater than a preset value; and removing the target region from the initial interior-shadow-effect image to obtain an interior-shadow-effect image for the target text.

In an embodiment, the drawing an initial interior-shadow-effect image corresponding to the target text based on the first distance field image includes: drawing a text body of the target text based on the original pixels in the first distance filed image; and drawing an interior shadow of the target text based on the offset pixels in the first distance filed image to obtain the initial interior-shadow-effect image corresponding to the target text.

In an embodiment, the drawing an interior shadow of target text based on the offset pixels in the first distance filed image includes: determining, for each of offset pixels in the first distance field image, a gradient value of the offset pixel based on a dot product of offset coordinates of the offset pixel and a gradient-direction vector, where the offset coordinates represent a difference between position coordinates of the offset pixel and coordinates of a gradient origin; determining, for each of offset pixels, a color value of the offset pixel collectively based on a gradient value of the offset pixel and target gradient colors; and drawing the interior shadow of the target text based on color values of the offset pixels.

In an embodiment, the method further includes: drawing an exterior-shadow-effect image corresponding to the target text based on the first distance field image.

In an embodiment, the drawing an exterior-shadow-effect image corresponding to the target text based on the first distance field image includes: drawing an exterior shadow of the target text based on the offset pixels in the first distance field image; and drawing the text body of the target text based on the original pixels in the first distance field image to obtain an exterior-shadow-effect image corresponding to the target text.

In an embodiment, the drawing the text body of the target text based on the original pixels in the first distance field image includes: determining color transparency values of the original pixels in the first distance field image, where for each of the original pixels, a distance field value of the original pixel is inversely proportional to a color transparency value of the original pixel; and drawing the text body of the target text based on the color transparency values of the original pixels.

In an embodiment, the drawing an exterior shadow of the target text based on the offset pixels in the first distance field image includes: determining, for each of offset pixels in the first distance field image, a gradient value of the offset pixel based on a dot product of offset coordinates of the offset pixel and a gradient-direction vector, where the offset coordinates represent a difference between position coordinates of the offset pixel and coordinates of a gradient origin; determining, for each of offset pixels in the first distance field image, a color value of the offset pixel based on a gradient value of the pixel and target gradient colors; and drawing the exterior shadow of the target text based on color values of the offset pixels.

In an embodiment, before the initial internal-shadow-effect image corresponding to the target text is drawn based on the first distance field image, the method further includes: performing color-mix for the original pixel and the offset pixel at the same position in the first distance field image based on color transparency values.

In an embodiment, the method further includes: determining gradient values corresponding to target pixels based on position information of the target pixels and a gradient-direction vector, where the gradient-direction vector represents a direction of color gradient; determining color values of the target pixels based on the gradient values corresponding to the target pixels and target gradient colors; and drawing a color-gradient-effect image corresponding to the target object based on the color values of the target pixels.

In an embodiment, before the gradient values corresponding to target pixels are determined based on position information of the target pixels and a gradient-direction vector, the method further includes: determining, in response to an angle-selection operation for a rotatable slider, the gradient-direction vector. There is correspondence between gradient-direction vectors and selected angles for the rotatable slider.

In an embodiment, the gradient values are within a range from a preset first boundary value to a preset second boundary value. The target gradient colors include a first target color and a second target color. A gradient value corresponding to the first target color is the preset second boundary value, and a gradient value corresponding to the second target color is the preset first boundary value. The determining color values of the target pixels based on the gradient values corresponding to the target pixels and target gradient colors includes: determining the color values of the target pixels based on the gradient values corresponding to the target pixels, the target gradient colors, the preset first boundary value and the preset second boundary value.

In an embodiment, the preset first boundary value is equal to 0, and the preset second boundary value is equal to 1. The determining the color values of the target pixels based on the gradient values corresponding to the target pixels, the target gradient colors, the preset first boundary value and the preset second boundary value includes: for each of the target pixel, calculating a product of a gradient value corresponding to the target pixel and a color value of the first target color as a first value; calculating, a difference between 1 and the gradient value corresponding to the target pixel and determining a product of the difference and a color value corresponding to the second target color as a second value; and determining a sum of the first value and the second value as a color value of the target pixel.

In an embodiment, the target object includes target text. Before the gradient values corresponding to the target pixels are determined based on the position information of the target pixels and the gradient-direction vector, the method further includes: determining, in the signed distance field image of the target text, pixels having distance field values with a preset range as the target pixels corresponding to the target text. The preset range is a range greater than 0 and less than a preset distance field value.

In an embodiment, before the color values of the target pixels are determined based on the gradient values corresponding to the target pixels and the target gradient colors, the method further includes: determining, based on the distance field values of the target pixels, color transparency values of the target pixels, where for each of the target pixels, a distance field value of the target pixel is inversely proportional to a color transparency value of the target pixel. The color values of the target pixels are determined based on the gradient values corresponding to the target pixels and the target gradient colors by: determining color values of the target pixels based on the gradient values corresponding to the target pixels, the color transparency values, and the target gradient colors.

In an embodiment, the gradient values are within a range from a preset third boundary value to a preset fourth boundary value. The target gradient colors include a third target color and a fourth target color. A gradient value corresponding to the third target color is the preset fourth boundary value, and a gradient value corresponding to the fourth target color is the preset third boundary value. Before the color values of the target pixels are determined based on the gradient values corresponding to the target pixels and the target gradient colors, the method further includes: receive a target gradient position, where the target gradient position is within a range from the preset third boundary value to the preset fourth boundary value. Accordingly, the color values of the target pixels are determined based on the gradient values corresponding to the target pixels and the target gradient colors by: determining, for each of the target pixels, whether a gradient value corresponding to the target pixel is within a range from the preset third boundary value to the target gradient position or whether the gradient value corresponding to the target pixel is within a range from the target gradient position to the preset fourth boundary value; determining, for each of the target pixels, the fourth target color as the color value of the target pixel in a case of determining that the gradient value corresponding to the target pixel is within the range from the preset third boundary value to the target gradient position or in a case of determining that the gradient value corresponding to the target pixel is not within the range from the target gradient position to the preset fourth boundary value; and otherwise, determining the third target color as the color value of the target pixel.

In a second aspect, a method for generating a text effect image is provided according to an embodiment of the present disclosure. The method includes: generating a signed distance field image of the target text with any of the foregoing method for generating a signed distance field image according to any one of the above; and generating a text effect image corresponding to the target text based on an effect-resource file and the signed distance field image of the target text.

In an embodiment, the generating a text effect image corresponding to the target text based on an effect-resource file and the signed distance field image of the target text includes: determining, in response to a selection operation for the effect-resource file, effect parameters for drawing layers for the target text based on the effect-resource file; and drawing the text effect image corresponding to the target text layer by layer based on the distance field image of the target text and the effect parameters for the drawing layers.

In a third aspect, an apparatus for generating a signed distance field image is provided according to an embodiment of the present disclosure. The apparatus includes a first determination module, a triangle-drawing module, a counting module, a second determination module, and a first generation module. The first determination module is configured to determine a target closed curve in an unsigned distance field image of target text, and an origin corresponding to the target closed curve. The triangle-drawing module is configured to draw a target triangle by taking two adjacent sample points on the target closed curve and the origin as vertices according to a sampling order of the adjacent sample points. The sampling order is a preset direction along the target closed curve. The counting module is configured to perform counting for pixels within the target triangle based on a drawing direction of the target triangle. The drawing direction of the target triangle is a clockwise direction or a counterclockwise direction. A counting manner in a case where the drawing direction is the clockwise direction is inverse to a counting manner in a case where the drawing direction is the counterclockwise direction. The counting manners include increment by N per count or decrement by N each per count, and N is a nonzero number. The second determination module is configured to determine that pixels having counting results equal to 0 in the unsigned distance field image are located in an interior region of the target text, and determine that pixels having counting results not equal to 0 in the unsigned distance field image are located in the exterior region of the target text. The first generation module is configured to generate a signed distance field image of the target text based on pixels located in the exterior region of the target text, pixels located in the interior region of the target text, and the unsigned distance field image.

In a fourth aspect, a system for generating a text effect image is provided according to an embodiment of the present disclosure. The system includes a distance-field generation unit and an effect-text generation unit. The distance-field generation unit is configured to generate a signed distance field image of target text with any of the foregoing method for generating a signed distance field image. The effect-text generation unit is configured to generate effect text corresponding to the target text based on an effect-resource file, and a signed distance field image generated by the distance-field generation unit for the target text.

In a fifth aspect, a computer-readable storage medium is provided according to an embodiment of the present disclosure. The computer-readable storage medium stores instructions, and the instructions, when being executed by a terminal device, cause the terminal device to perform any of the foregoing methods.

In a sixth aspect, a device is provided according to an embodiment of the present disclosure. The device includes a memory, a processor and a computer program stored in the memory and executable on the processor. The processor, when executing the computer program, performs any of the foregoing methods.

In a seventh aspect, a computer program product is provided according to an embodiment of the present disclosure. The computer program product includes a computer program or instructions. The computer program or instructions, when being executed by a processor, performs any of the foregoing methods.

The technical solutions according to the embodiments in the present disclosure have at least the following advantages compared with the conventional technology.

A method for generating a signed distance field image is provided according to an embodiment of the present disclosure. Counting is performed for each pixel within a triangle based on a drawing direction of the triangle. A pixel having a counting result equal to 0 is determined to be located in the exterior region of the target text, and a pixel having a counting result not equal to 0 is determined to be located in the interior region of the target text, so as to accurately determine a position of each pixel within the overlapping region where the closed curves overlap in the target text. It can be seen that in the embodiments of the present disclosure, a counting manner for pixels and a manner for determining whether a pixel is located in the interior region of the text based on a counting result of the pixel are improved in the shape-drawing phase, which improves the accuracy of determining whether a pixel within the overlapping region where the closed curves overlap in the text is located in the interior region of the text, thereby improving the accuracy of generating the signed distance field image.

BRIEF DESCRIPTION OF THE DRAWINGS

The drawings herein are incorporated into the specification and constitute a part of the specification. The drawings show embodiments of the present disclosure. The drawings and the specification are used to explain the principle of the present disclosure.

In order to more clearly illustrate technical solutions in embodiments of the present disclosure or in the conventional technology, the drawings to be used in the description of the embodiments or the conventional technology are briefly described below. Apparently, those skilled in the art may obtain other drawings according to the provided drawings without any creative work.

FIG. 5 is a schematic diagram showing a contour effect of text;

FIG. 6 is a flowchart of a method for processing an contour effect of text according to an embodiment of the present disclosure;

DETAILED DESCRIPTION OF EMBODIMENTS

In order to more clearly understand the above objectives, features, and advantage of the present disclosure, the solutions of the present disclosure are further described hereinafter. It should be noted that the embodiments of the present disclosure and the features in the embodiments may be combined with each other if there is no conflict.

In the following detailed description, numerous specific details are set forth in order to provide thorough understanding of the present disclosure. The present disclosure may also be implemented in other ways different from those described here. Apparently, the embodiments in the specification are only a part of the embodiments of the present disclosure, rather than all the embodiments.

A distance field image of text records a minimum distance from each of pixels located in an interior region and an exterior region of the text to a contour (also referred to as a boundary) of the text, where the minimum distance is also referred to as a distance field value. It can be determined whether each of the pixels is located in the interior region of the text or the exterior region of the text based on the distance field values in the signed distance field image of text. Specifically, distance field values of pixels located in the interior region of the text are set to be negative numbers, and distance field values of pixels located in the exterior region of the text are set to be positive numbers.

Currently, a method for generating a signed distance field image of text includes a line-drawing phase, a shape-drawing phase, and a color reverse and signed transformation phase. During the line-drawing phase, an unsigned distance field image of text is drawn. During the shape-drawing phase, it is required to determine whether each of pixels in the unsigned distance field image is located in the interior region of the text or the exterior region of the text.

During the color reverse and signed transformation phase, color reverse processing is performed on pixels located in the interior region of the text in the unsigned distance field image. Finally, the signed distance field image of the text is obtained.

In the conventional method for determining whether each pixel in an unsigned distance field image is located in an interior region or an exterior region of text, it is determined, for each pixel, whether the pixel is located in the interior region of the text or the exterior region of the text based on parity of an accumulative counting result of the pixel. Specifically, a pixel having an accumulative counting result being of an odd number is determined to be located in the interior region of the text, and a pixel having an accumulative counting result being of an even number is determined to be located in the exterior region of the text.

Figure 1:
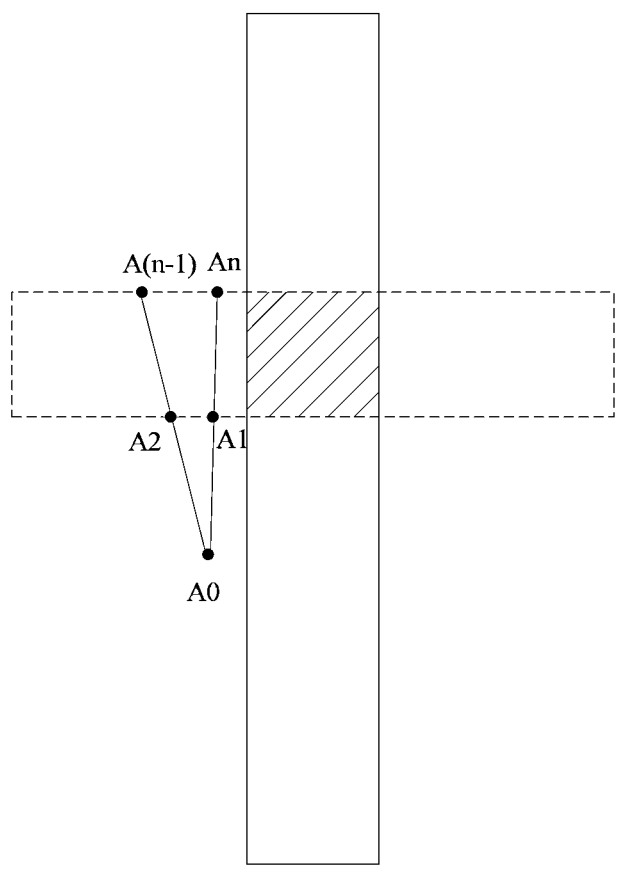
FIG. 1 is a schematic diagram of an unsigned distance field image of text "+" according to an embodiment of the present disclosure.

As shown in FIG. 1, which is a schematic diagram of an unsigned distance field image of target text "+", a dotted line indicates a closed curve 1, a solid line indicates a closed curve 2, and a shaded region indicates an overlapping region where the closed curve 1 overlaps the closed curve 2. For the closed curve 1, assuming that an origin is A0, uniform sampling is performed on pixels on the closed curve 1 to determine sample points A1, A2 . . . , and Ak on the closed curve 1. A triangle is drawn by taking the origin A0 and two adjacent sample points on the closed curve 1 as vertices. For example, a triangle A1A2A0 is drawn by taking A1, A2, and A0 as vertices. A counting number of each pixel within the triangle A1A2A0 is increased by 1. Vertices are determined and triangles are drawn in this manner. When a triangle A(n-1)AnA0 is drawn by taking A(n-1), An, and A0 as vertices, a counting number of each pixel within the triangle A(n-1)AnA0 is increased by 1. It can be understood that at this time, a counting result of each pixel within the triangle A1A2A0 is equal to 2, and a counting result of each pixel within a region defined by A(n-1), An, A1, and A2 is equal to 1. It can be seen that it may be determined whether a pixel is located in an interior region of the text by: determining that the pixel is located in the exterior region of the text in a case of a counting result of the pixel being an even number; and determining that the pixel is located in the interior region of the text in a case of the counting result of the pixel being an odd number.

However, for text including multiple closed curves, for example, the text including the closed curve 1 and the closed curve 2 as shown in FIG. 1, a position of a pixel located within an overlapping region where the closed curves overlap cannot be accurately determined with the above method. Specifically, assuming that the closed curve 2 is processed with the above method for processing the closed curve 1, a counting result of a pixel within the region defined by A(n-1), An, A1, and A2 is increased by 1 to be 2. If it is determined that the pixel is located in the exterior region of the text because the counting result is an even number, it is apparent that the determination result is inaccurate. Therefore, for text including multiple closed curves overlap with each other, the determination of whether a pixel is located in an interior region of the text based on parity of a counting result of the pixel is apparently inaccurate, which results in inaccuracy of the signed distance field image generated based on the determination result.

In view of this, a method for generating a signed distance field image is provided according to an embodiment of the present disclosure, in which a manner for counting pixels and a manner for determining whether a pixel is located in the interior region of text based on a counting result during the shape-drawing phase are changed, to improve the accuracy of determining whether a pixel in the overlapping region of the closed curves in the text is located in the interior region of the text, thereby improving the accuracy of generating the signed distance field image.

Specifically, first, for each closed curve in an unsigned distance field image of target text, an origin corresponding to the closed curve is determined and a counting procedure is implemented for pixels on the closed curve. The counting procedure for pixels is described as following. Firstly, sample points are successively determined along a preset direction on the closed curve. Then two sample points, at adjacent positions, among the sample points, and the origin are determined as vertices, and a drawing direction is determined based on a sampling order of the two sample points. A triangle is drawn based on the drawing direction and the vertices. Then a counting manner for pixels within the triangle is determined based on the drawing direction, and counting is performed for each of the pixels within the triangle based on the counting manner. After all sample points on all closed curves in the unsigned distance field image of the target text are used as vertices for drawing triangles, it is determined, for each pixel in the unsigned distance field image, whether a counting result for the pixel is equal to 0, to determine position information indicating whether the pixel is located at the interior region of the target text. Finally, a signed distance field image of the target text is generated based on interior-exterior position information of pixels in the unsigned distance field image and the unsigned distance field image.

In the embodiments of the present disclosure, a counting manner for pixels within a triangle is determined based on a drawing direction of the triangle, for example, increment by 1 or decrement by 1, so that a counting result of a pixel within the overlapping region is equal to the number of overlapping closed curves corresponding to the overlapping region. As shown in FIG. 1, the overlapping region corresponds to two overlapping closed curves, which are the closed curve 1 and the closed curve 2. For a pixel located in the exterior region of the target text, the pixel is not only located in the interior region of the triangle A1A2A0 drawn counterclockwise (increment by N), but also located in the interior region of the triangle A(n-1)AnA0 drawn clockwise (decrement by N), so that a counting result of the pixel is equal to 0. In the embodiments of the present disclosure, it is determined whether a pixel is located in the interior region of the target text by determining whether a counting result of the pixel is equal to 0. For target text including multiple closed curves overlap with each other, it can be accurately determined whether each pixel in the target text is located in the interior region of the target text, and thus a signed distance field image of the target text can be accurately generated.

Figure 2:
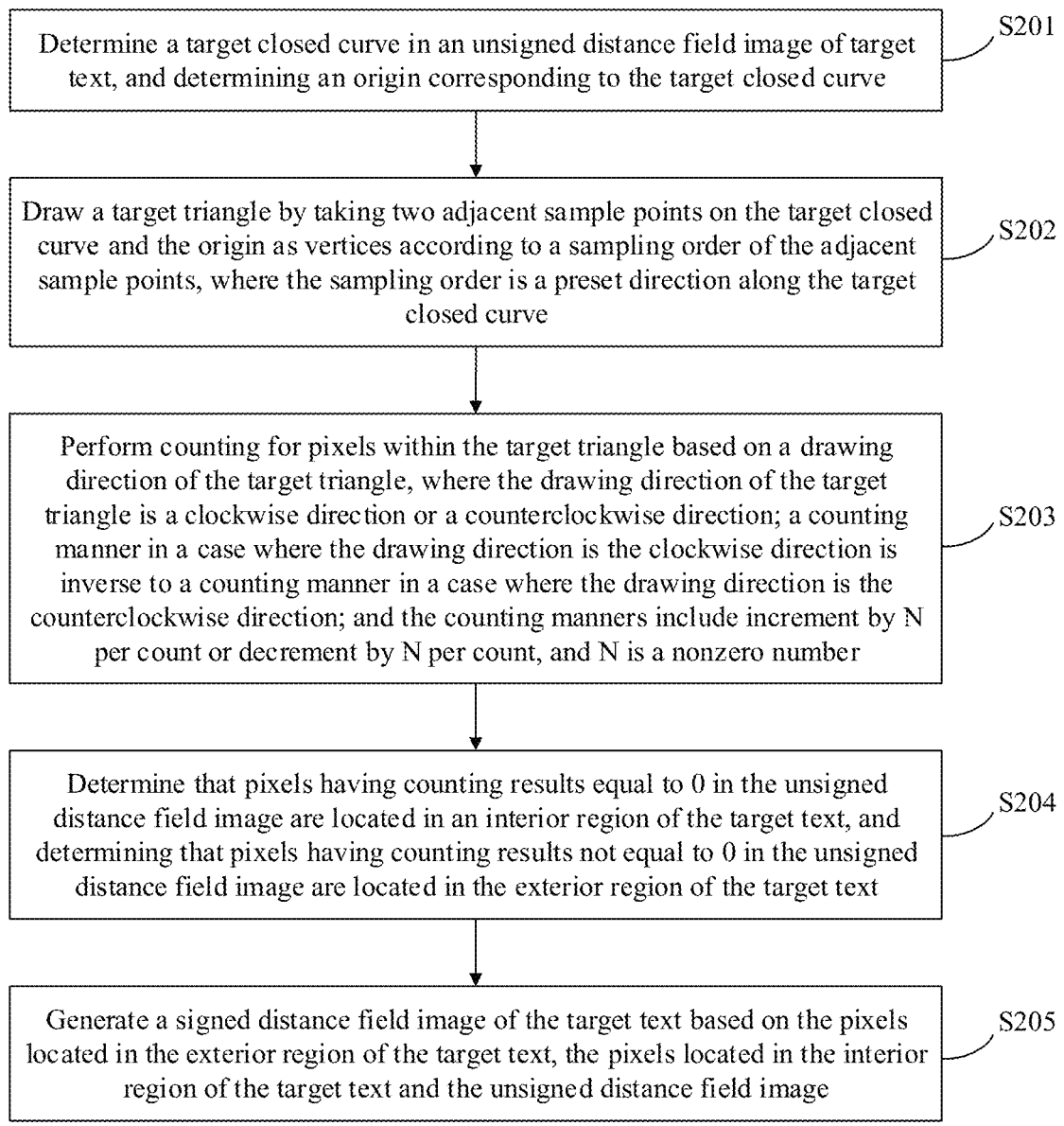
FIG. 2 is a flowchart of a method for generating a signed distance field image according to an embodiment of the present disclosure.

A method for generating a signed distance field image is provided according to an embodiment of the present disclosure based on this. Reference is made to FIG. 2, which is a flowchart of a method for generating a signed distance field image according to an embodiment of the present disclosure, and the method includes the following steps S201 to S205.

In step S201, a target closed curve in an unsigned distance field image of target text, and an origin corresponding to the target closed curve are determined.

In the embodiments of the present disclosure, an unsigned distance field image of the target text is generated based on vector contour information of the target text before a signed distance field image is generated for the target text. The unsigned distance field image records a minimum distance from each of pixels located in an interior region and an exterior region of the text to a contour (also referred to as a boundary) of the text, where the minimum distance is also referred to as a distance field value. It cannot be determined whether a pixel is located in the interior region of the target text based on a distance field value of the pixel in the unsigned distance field image. Therefore, in a process of generating the signed distance field image based on the unsigned distance field image, the key is to determine pixels located in the interior region of the target text and pixels located in the exterior region of the target text in the unsigned distance field image, which will be described in detail below.

In the embodiments of the present disclosure, the vector contour information of the target text may include a vector diagram, a bitmap or the like of the target text. In the line-drawing phase of generating the signed distance field image of the target text, for each curve segment in the target text, a box containing the curve segment is drawn based on the vector contour information of the target text. Then, for each pixel within the box, a distance between the pixel and the curve segment is calculated with a method such as analytic geometry, and drawing is performed by taking the distance as color information (a larger distance corresponds to a darker color). In addition, data of curve segments in the structure of the target text are fused with a depth test method of GPU. For a pixel corresponding to more than one distance value, a smallest distance value corresponding to the pixel is determined as a distance field value of the pixel. In this way, distance field values of pixels on the structure of the target text and pixels within a certain range around the target text can be calculated, so as to form the unsigned distance field image of the target text.

In the embodiments of the present disclosure, after the unsigned distance field image of the target text is obtained, each closed curve in the unsigned distance field image is used as a target closed curve and an origin corresponding to the target closed curve is determined. Then the following counting procedure for pixels is performed for each target closed curve.

In the embodiments of the present disclosure, origins may be determined randomly for the closed curves. The closed curves may correspond to a same origin or different origins.

In the embodiments of the present disclosure, the closed curves are processed in a same way. The closed curves may be processed in parallel or successively, which is not limited in the embodiments of the present disclosure. In the following, the processing for the target closed curves is described in detail by exemplarily taking the closed curve 1 and the closed curve 2 in FIG. 1 as the target closed curves individually.

In step S202, a target triangle is drawn, by taking two adjacent sample points on the target closed curve and the origin as vertices, according to a sampling order of the adjacent sample points. The sampling order is a preset direction along the target closed curve.

In practice, sample points are successively determined along the preset direction on the target closed curve. Two adjacent sample points among the sample points and the origin are determined as vertices, a drawing direction is determined based on the sampling order of the two adjacent sample points, and the target triangle is drawn based on the drawing direction and the determined vertices. The drawing direction is a clockwise direction or a counterclockwise direction.

In the embodiments of the present disclosure, uniform sampling is performed on the target closed curve in a clockwise direction or a counterclockwise direction after the target closed curve is determined, to determine the sample points on the closed curve. As shown in the closed curve 1 in FIG. 1, uniform sampling is performed on the pixels on the closed curve 1 along a clockwise direction A1A2 . . . A(n-1)An to obtain sample points A1, A2 . . . A(n-1), An . . . and Am.

Then, two sample points at adjacent positions on the target closed curve, for example, A1 and A2 on the closed curve 1, are determined as two adjacent sample points. The two adjacent sample points A1 and A2 and the origin A0 are determined as vertices, and a triangle A1A2A0 is drawn along a sampling order A1→A2. The drawing direction of the triangle A1A2A0 is determined to be a counterclockwise direction based on the sampling order A1→A2.

For another example, two sample points A(n-1) and An at adjacent positions on the target closed curve 1 are determined as two adjacent sample points. The two adjacent sample points A(n-1) and An, and the origin A0 are determined as vertices, and a triangle A(n-1)AnA0 is drawn along a sampling order A(n-1)→An. The drawing direction of the triangle A(n-1)AnA0 is determined to be a clockwise direction based on the sampling order A(n-1)→An.

In step S203, counting is performed for pixels within the target triangle based on the drawing direction of the target triangle. The drawing direction of the target triangle is a clockwise direction or a counterclockwise direction. A counting manner in a case where the drawing direction is the clockwise direction is inverse to a counting manner in a case where the drawing direction is the counterclockwise direction. The counting manners include increment by N or decrement by N, and N is a nonzero number.

In the embodiments of the present disclosure, after determining the drawing direction of the target triangle, the counting manner for pixels within the target triangle is determined based on the drawing direction. A counting manner in a case where the drawing direction is the clockwise direction is inverse to a counting manner in a case where the drawing direction is the counterclockwise direction.

In an embodiment, in a case that the drawing direction of the target triangle is a clockwise direction, a counting manner for pixels within the target triangle is increment by N. In addition, in a case that the drawing direction of the target triangle is a counterclockwise direction, a counting manner for pixels within the target triangle is decrement by N. N is a nonzero number. For example, N may be 1.

In another implementation, in a case that the drawing direction of the target triangle is a clockwise direction, a counting manner for pixels within the target triangle is decrement by N. In addition, in a case that the drawing direction of the target triangle is a counterclockwise direction, a counting manner for pixels within the target triangle is increment by N. N is a nonzero number. For example, N may be 1.

In the embodiments of the present disclosure, counting is performed for pixels within the target triangle after the counting manner for the pixels within the target triangle is determined. Taking FIG. 1 as an example, a drawing direction of the triangle A1A2A0 is a counterclockwise direction. Assuming that a count number for each pixel within the triangle A1A2A0 is increased by 1 based on the determined counting manner, a count number of each pixel within the triangle A(n-1)AnA0 is decreased by 1 because the drawing direction of the triangle A(n-1)AnA0 is a clockwise direction.

Pixels within the triangle A1A2A0 are also located within the triangle A(n-1)AnA0. Therefore, the counting for pixels within the triangle A1A2A0 (pixels located in the exterior region of the target text) is to be performed twice, i.e., increment by 1 first and then decrement by 1, and a counting result is equal to 0. For pixels within a region defined by A(n-1)AnA1A2, counting is performed only once, that is, increment by 1 and a counting result is equal to 1.

In the embodiments of the present disclosure, the closed curve 2 in FIG. 1 is processed in the above way. It can be understood that counting is required to be performed only once for pixels on the closed curve 2 that are located in the interior region of the target text, that is, increment by 1. Therefore, combined with a processing result for the closed curve 1, counting is required to be performed twice for each pixel within the overlapping region indicated by the shaded region, and counting result is equal to 2. Counting results for pixels located in the exterior region of the target text are equal to 0.

It can be understood that, based on the counting manner according to the embodiments of the present disclosure, a counting result for a pixel located in the exterior region of the target text is equal to 0 and a counting result for a pixel located in the interior region of the target text is not equal to 0. It can be determined whether a pixel is located in the interior region of the target text based on the above rule in the embodiments of the present disclosure.

In practice, all sample points on all closed curves in the unsigned distance field image of the target text are used as vertices for drawing target triangles and counting is performed for pixels within the target triangles.

In the embodiments of the present disclosure, the closed curves in the unsigned distance field image may be taken as target closed curves and processed in parallel. Alternatively, the closed curves may be successively taken as the target closed curve and processed successively.

In an embodiment, after determining a closed curve as a target closed curve, drawing target triangles for the target closed curve, and performing counting for pixels within the target triangles, the procedure repeats in which another closed curve is determined as the target closed curve, target triangles are drawn and counting is performed for pixels within the target triangles, until it is determined that for all closed curves in the unsigned distance field image, target triangles are drawn and counting is performed for pixels within the target triangles. In this way, counting results for all pixels in the unsigned distance field image are obtained.

In step S204, it is determined that pixels having counting results equal to 0 in the unsigned distance field image are located in an interior region of the target text, and pixels having counting results not equal to 0 in the unsigned distance field image are located in the exterior region of the target text.

In the embodiments of the present disclosure, after the procedure of drawing target triangles and performing counting for pixels within the target triangles is performed for all closed curves in the unsigned distance field image, it is determined, for each pixel in the unsigned distance field image, whether the pixel is located in the exterior region of the target text or the interior region of the target text based on a counting result of the pixel.

It can be determined that a counting result for a pixel located in the exterior region of the target text is equal to 0 and that a counting result for a pixel located in the interior region of the target text is not equal to 0, based on the counting manner determined according to the drawing direction of the triangle. Therefore, in the embodiments of the present disclosure, pixels having counting results equal to 0 in the unsigned distance field image may be determined to be located in the interior region of the target text, and pixels having counting results not equal to 0 in the unsigned distance field image may be determined to be located in the exterior region of the target text.

In step S205, a signed distance field image of the target text is generated based on pixels located in the exterior region of the target text, pixels located in the interior region of the target text, and the unsigned distance field image.

In the embodiments of the present disclosure, the signed distance field image of the target text is generated based on the pixels located in the exterior region of the target text, the pixels located in the interior region of the target text, and the unsigned distance field image, after it is determined, for each pixel in the unsigned distance field image of the target text, whether the pixel is located in the interior region of the target text.

In an embodiment, in the color reverse and signed transformation phase of generating a signed distance field image, color reverse processing is performed, in the unsigned distance field image, for pixels located in the interior region of the text, to transform the unsigned distance field image into a signed distance field image, so as to distinguish the interior region of the target text from the exterior region of the target text.

In the method for generating a signed distance field image according to an embodiment of the present disclosure, a counting manner for pixels and a manner for determining whether a pixel is located in the interior region of the text based on a counting result of the pixel in the shape-drawing phase are improved, which improves the accuracy of determining whether a pixel in the overlapping region of the closed curves in the text is located in the interior region of the text, thereby improving the accuracy of generating the signed distance field image.

In an application scenario, real-time processing is adopted in the embodiments of the present disclosure in order to avoid a storage pressure caused by pre-generation of distance field images of a large amount of text. A signed distance field image of target text is generated in real time when receiving the target text inputted by the user, which reduces the storage pressure.

In addition, a buffering mechanism is provided according to an embodiment of the present disclosure to buffer the signed distance field image generated for the target text. Specifically, the signed distance field image may be buffered in a GPU for subsequent use.

In addition, at present, a distance field value of each pixel in the signed distance field image is stored by using one of four color channels of RGBA. Each color channel is capable of storing an 8-bit unsigned integer, and cannot completely store a distance field value in a form of a 32-bit floating-point number. Therefore, the conventional storage manner causes serious damage to the quality of the signed distance field image, which results in serrated edge defects when the signed distance field image is scaled at a large ratio in application.

Therefore, a distance field value of each pixel is stored by using four color channels in the embodiments of the present disclosure in order to completely store the distance field values of the pixels in the signed distance field image of the target text, so as to ensure the quality of the signed distance field image. Specifically, the distance field value of each pixel is stored by using four color channels of RGBA.

In practice, in storage of the signed distance field image of the target text, for each pixel in the signed distance field image, a distance field value of the pixel is split into four 8-bit unsigned integers. The distance field value is a 32-bit floating-point number. Specifically, the 32-bit floating-point number is split into four 8-bit unsigned integers. Then, the four 8-bit unsigned integers are stored by using the four color channels of RGBA respectively. The undamaged storage of the signed distance field image is achieved by storing distance field values of the pixels in the signed distance field image of the target text in the above manner, so as to ensure the quality of the signed distance field image.

In an embodiment, four parts including integer part, [1/256, 1], [1/256$^2$, 1/256], and [1/256$^3$, 1/256$^2$] of the distance field value of each pixel in the signed distance field image may be multiplied by 1, 256, 256$^2$, and 256$^3$ respectively to obtain four 8-bit unsigned integers.

In an embodiment, a distance filed value in a form of a 32-bit floating-point number may be split into four 8-bit unsigned integers by using a rounding function floor( ). The four 8-bit unsigned integers are respectively expressed as:

$a1 = \text{floor}(X);$ $a2 = \text{floor}((X-a1)*256);$ $a3 = \text{floor}((X-a1-a2*256)*256^2);$ and $a4 = \text{floor}((X-a1-a2*256-a3*256^2)*256^3).$ In practice, after the distance field values of the pixels in the signed distance field image of the target text are stored in the above manner, it is required to restore the distance field values each stored in a form of four 8-bit unsigned integers to a 32-bit floating-point number for applying the signed distance field image. Specifically, values obtained by dividing the four 8-bit unsigned integers representing the distance field value by 1, 256, 256$^2$, and 256$^3$ respectively are combined to obtain a 32-bit floating-point number as the distance field value of a corresponding pixel. For example, a restored distance field value is expressed as $Y = a1 + a2/256 + a3/256^2 + a4/256^3$ based on the above calculation.

Lossless distance field values of pixels can be obtained through the above processing, which avoids an accuracy loss of the signed distance field image of the target text.

In addition, in an embodiment of the present disclosure, both the target text and a target typeface file corresponding to the target text, for example, Song typeface file, are determined before a signed distance field image of the target text is generated. The signed distance field image of the target text is generated collectively from the target text and the target typeface file.

However, a target typeface file including a third-order Bezier curve is not applicable to the conventional method for generating a signed distance field image. Therefore, in the embodiments of the present disclosure, in a case of determining that the target typeface file includes a third-order Bezier curve, the third-order Bezier curve in the target typeface file is converted into a second-order Bezier curve. Then, the unsigned distance field image of the target text is generated collectively based on the converted target typeface file and vector contour information of the target text, so as to generate the signed distance field image of the target text subsequently.

The otf typeface file and the ttc typeface file each include a third-order Bezier curve. Therefore, it is to convert the third-order Bezier curve to a second-order Bezier curve before generating a distance field image.

It should be noted that when other typeface file including a third-order Bezier curve is applied to the method for generating a signed distance field image according to an embodiment of the present disclosure, it is also required to convert the third-order Bezier curve into a second-order Bezier curve.

In addition, the amount of information carried by a second-order Bezier curve is much larger than the amount of information carried by a straight segment, so that the number of segments is greatly reduced. Therefore, by converting the third-order Bezier curve in the target typeface file into a second-order Bezier curve, data burden can be reduced in the embodiments of the present disclosure.

Figure 3:
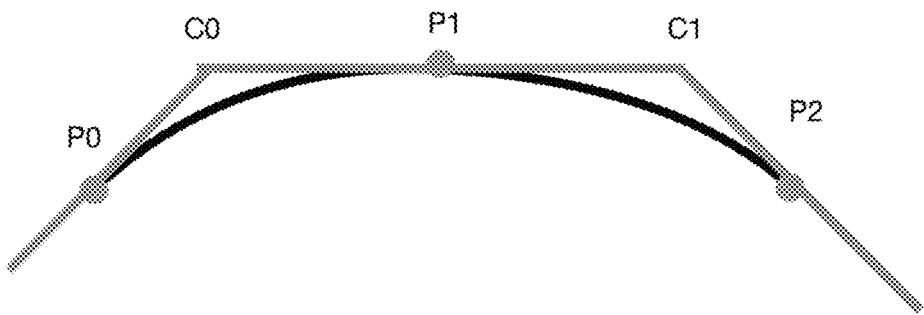
FIG. 3 shows a schematic effect of converting a third-order Bessel curve into a second-order Bessel curve according to an embodiment of the present disclosure.

In an embodiment, a third-order Bezier curve is converted into a second-order Bezier curve by: selecting multiple sampled points on the third-order Bezier curve, determining tangent lines of the multiple sampled points, determining an intersection of tangent lines of two adjacent sampled points, for example, P0 and P1 in FIG. 3, to obtain a control point C0 corresponding to the second-order Bessel curve. Three points P0, C0, and P1 form a segment of the second-order Bezier curve. In this way, an intersection of tangent lines of two adjacent sampled points, for example, P1 and P2, is determined to obtain a control point C1 corresponding to the second-order Bezier curve. Three points P1, C1, and P2 form another segment of the second-order Bezier curve. The sampled points on the third-order Bessel curve are processed successively in this way, and finally the second-order Bessel curve including points P0, C0, P1, C1, and P2 is obtained.

In addition, in the embodiments of the present disclosure, a text effect image corresponding to the target text can be generated based on the signed distance field image of the target text.

Therefore, a method for generating a text effect image is provided according to an embodiment of the present disclosure based on the above embodiments.

First, a signed distance field image of the target text is generated with the method for generating a signed distance field image according to the above embodiments. Then, a text effect image corresponding to the target text is generated based on an effect-resource file and the signed distance field image of the target text.

The effect-resource file may be a configuration file for a text effect, for example, a configuration file for an interior-exterior-shadow effect, including configuration parameters such as a color of an interior-exterior shadow and a width of the shadow.

In practice, text effect corresponding to the target text is generated based on the effect-resource file and the signed distance field image after the signed distance field image of the target text and the effect-resource file are determined.

In an embodiment, it is determined, in response to a selection operation for the effect-resource file, effect parameters for drawing layers of the target text based on the effect-resource file. Then, the text effect image corresponding to the target text is drawn layer by layer based on the distance field image of the target text and the effect parameters for the drawing layers.

In an embodiment, the effect parameters for the drawing layers may be determined for the target text based on the effect-resource file. The target text may have multiple drawing layers. Each of the multiple drawing layers includes multiple contour effects, and each contour effect includes effect parameters. The effect parameters for the drawing layers of the target text are determined based on the effect-resource file when receiving a selection operation for the effect-resource file, then effect text corresponding to the target text is drawn layer by layer based on the effect parameters for the drawing layers and the distance field image.

The effect parameters of each drawing layer may include an offset parameter, an edge-gradient coefficient and the like. Each drawing layer may be configured to have an effect such as an interior/exterior-shadow effect, an illumination effect, and a dynamic-change effect. Each drawing layer may further include multiple contour effects. Each contour effect may have parameters such as a contour width. Contours of different text may be merged for display. In addition, each contour effect may be configured as a color-gradient effect, a texture-filling effect, and the like. The color-gradient effect may be a single-color-gradient effect, a double-color-gradient effect, a triple-color-gradient effect, or the like.

A third-phase protocol from an upper layer to a lower layer can be realized based on the above setting of the effect parameters for drawing layers, so that almost all text effects can be realized based on the above protocol, which meets requirements for displaying various text effects.

Figure 4:
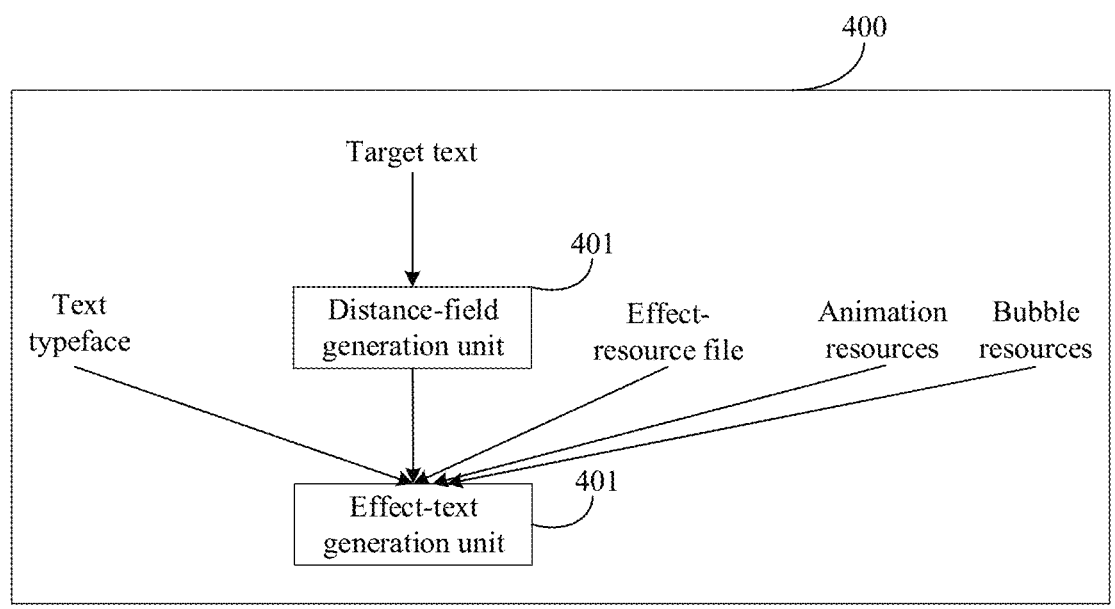
FIG. 4 is a schematic structural diagram of a system for generating a text effect image according to an embodiment of the present disclosure.

Based on the content in the above embodiments, reference is made to FIG. 4, which is a schematic structural diagram of a system 400 for generating a text effect image according to an embodiment of the present disclosure. The system includes a distance-field generation unit 401 and an effect-text generation unit 402.

The distance-field generation unit 401 is configured to generate a signed distance field image of target text with the method for generating a signed distance field image described above.

The effect-text generation unit 402 is configured to generate effect text corresponding to the target text based on an effect-resource file, and a signed distance field image generated by the distance-field generation unit for the target text.

It can be understood that the function of generating a signed distance field image is independent of other functions in the system for generating a text effect image. By selecting different effect-resource files and combining with the signed distance field image generated by the distance-field generation unit for the target text, various effects for the target text can be obtained.

In addition, by selecting different typeface files and combining with the signed distance field image generated by the distance-field generation unit for the target text, effects of various typefaces corresponding to the target text can be obtained.

In addition, by selecting different animation resources and bubble resources and combining with the signed distance field image generated by the distance-field generation unit for the target text, an animation effect and a bubble effect corresponding to the target text can be obtained.

It should be noted that in the system for generating a text effect image for target text based on a signed distance field image according to an embodiment of the present disclosure, the effect-resource file is not limited. Various effects of the target text can be obtained based on the system for generating a text effect image according to the embodiments of the present disclosure.

A contour effect of text is a commonly used text effect. How to draw a contour effect of text currently attracts a lot of attention.

Conventional contour-effect drawing for text has a problem of contour fusion, as shown in FIG. 5, which is a schematic diagram showing a contour effect of text. Contours of text drawn on a canvas at different time may overlap with each other, which affects a display effect of the text. Therefore, there is an urgent requirement for a method for processing a contour effect of text to improve a display effect of the text.

A contour effect of text is usually drawn based on bitmap text. A signed distance field image of text records a minimum distance from each of pixels located in an interior region and an exterior region of the text to a contour (also referred to as a boundary) of the text, where the minimum distance is also referred to as a distance field value. In a signed distance field image, distance field values of pixels located in the interior region of the text are set to be negative numbers, and distance field values of pixels located in the exterior region of the text are set to be positive numbers. It is founded that the signed distance field image of text is conductive to drawing a contour effect of the text.

In view of this, a method for processing a contour effect of text is provided according to an embodiment of the present disclosure. In response to detecting that there is a pixel, in the signed distance field image of the target text, has the same position coordinates as a pixel in an image already drawn on a canvas, a distance field value of the pixel in the signed distance field image is compared with a distance field value of the pixel in the image already drawn on the canvas. In response to determining that the distance field value of the pixel in the signed distance field image is smaller, the pixel in the signed distance field image is drawn onto the canvas. A contour-effect image corresponding to the target text is finally generated based on pixels in the signed distance field image which are drawn onto the canvas.

In the embodiments of the present disclosure, considering the characteristics that a distance field value of a pixel located in the interior region of the text is negative, a distance field value of a pixel located in the exterior region of the text is positive, and the distance field value of the pixel located in the interior region of the text is certainly less than the distance field value of the pixel located in the exterior region of the text, distance field values of pixels located at a same position are compared with each other to ensure that pixels with smaller distance field values are drawn onto the canvas. In the finally generated contour-effect image, an inner contour of target text is not covered by an outer contour of other text, thereby improving a display effect of the target text.

Based on this, a method for processing a contour effect of text is provided according to an embodiment of the present disclosure. Referring to FIG. 6, which is a flowchart of a method for processing a contour effect of text according to an embodiment of the present disclosure, the method includes the following steps S601 to S603

In step S601, in response to detecting in the signed distance field image of the target text, a pixel having the same position coordinates as a pixel in an image already drawn on a canvas, a distance field value of the pixel in the signed distance field image is compared with a distance field value of the pixel in the image already drawn on the canvas.

In the embodiments of the present disclosure, the signed distance field image of the target text is first obtained before a contour effect of the target text is drawn. Then it is detected whether there is a pixel, in the signed distance field image of the target text, having the same position coordinates as a pixel in an image already drawn on the canvas.

In practice, once detecting in the signed distance field image of the target text, a pixel having the same position coordinates as a pixel in the image already drawn on the canvas, a distance field value of the pixel in the signed distance field image is compared with a distance field value of the pixel in the image already drawn on the canvas. Assuming that the pixels having the same position coordinates are a first pixel and a second pixel, and the first pixel is in the signed distance field image of the target text and the second pixel is in the image already drawn on the canvas, a distance field value of the first pixel is compared with a distance field value of the second pixel.

In an embodiment, the distance field value of the first pixel is determined based on the signed distance field image of the target text, and the distance field value of the second pixel is determined based on a signed distance field image corresponding to the image already drawn on the canvas. Then, the distance field value of the first pixel is compared with the distance field value of the second pixel.

In practice, in response to detecting that there is no pixel, in the signed distance field image of the target text, having the same position coordinates as a pixel in the image already drawn on the canvas, a contour effect of the target text is directly drawn on the canvas based on the signed distance field image, and an inner contour of the target text will not be covered.

In step S602, in response to determining, among the pixels having the same position coordinates, that the distance field value of the pixel in the signed distance field image is less than a first value, the pixel in the signed distance field image is drawn on the canvas.

Since distance field values of pixels located in the interior region of the text are negative numbers and distance field values of pixels located in the exterior region of the text are positive numbers, the distance field value of the pixel located in the interior region of the text is certainly greater than the distance field value of the pixel located in the exterior region of the text. In the embodiments of the present disclosure, in order to ensure the display effect of the text, the display of the inner contour of the text body is superior over the display of the outer contour of the text. Therefore, in the embodiments of the present disclosure, the distance field values of the pixels having the same location coordinates are compared to ensure that the pixels having distance field values less than the first value are drawn onto the canvas. That is, pixels having smaller distance field values are drawn onto the canvas, so as to ensure the display effect of the text body. The first value may be set according to actual situations.

In practice, a smaller distance field value of the pixel in the signed distance field image of the target text, among the pixels having the same position coordinates, indicates a high probability of the pixel in the signed distance field image being located in the interior region of the text. Therefore, in the embodiments of the present disclosure, such pixel in the signed distance field image is drawn onto the canvas, which ensures the display effect of the text body.

In an embodiment, in a case of determining that the distance field value of the pixel in the signed distance field image of the target text is smaller, a color value of the pixel is determined based on the distance field value of the pixel, and then the pixel is drawn onto the canvas based on the color value.

In an embodiment, correspondence between color values and distance-field-value ranges is predetermined. For example, a color value corresponding to a distance-field-value range [−m, n] (m and n are arbitrary values, for example, m is equal to 0.8 and n is equal to 0) is white, and a color value corresponding to a distance-field-value range [j, k] (j and k are arbitrary values, for example, j is equal to 0 and k is equal to 1) is yellow. Then, in response to determining that the distance field value of the pixel in the signed distance field image of the target text is smaller, the color value corresponding to the distance field value of the pixel is determined as a color value of the pixel based on the correspondence.

In an embodiment, in response to determining, among the pixels having the same position coordinates, that the distance field value of the pixel in the signed distance field image of the target text is greater than a second value, a mark is made for the pixel in the signed distance field image. The mark is used for indicating that the pixel is not to be drawn onto the canvas. The pixel with the mark is not drawn when the target text is drawn. In a case of determining, among the pixels having the same position coordinates, that the distance field value of the pixel in the signed distance field image of the target text is greater than the second value, that is, in a case of determining, among the pixels having the same position coordinates, that the distance field value of the pixel in the signed distance field image of the target text is larger, a mark is made for the pixel in the signed distance field image and the pixel is not drawn onto the canvas. The second value may be set according to actual situations.

In step S603, a contour-effect image corresponding to the target text is generated based on pixels in the signed distance field image which are drawn onto the canvas.

In the embodiments of the present disclosure, color values of pixels are determined before the pixels are drawn on the canvas.

In an embodiment, a color value corresponding to a distance field value of a pixel may be determined as a color value of the pixel based on the correspondence between color values and distance-field-value ranges. Specifically, the correspondence between the color values and the distance-field-value ranges is predetermined. Then, for each pixel in the signed distance field image, a distance-field-value range corresponding to a distance field value of the pixel is determined, and a color value corresponding to the distance-field-value range is determined as a color value of the pixel.

Figure 7:
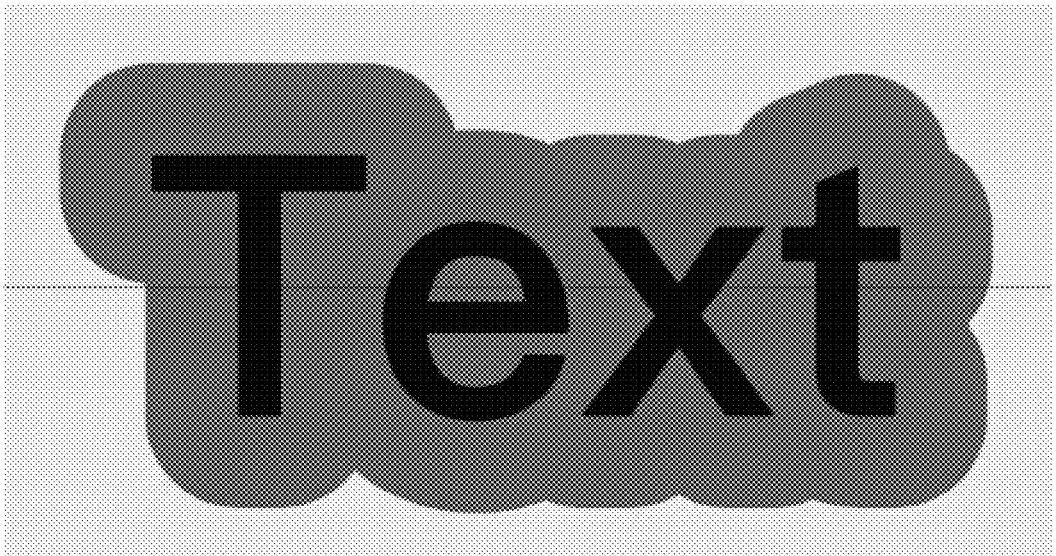
FIG. 7 is a schematic diagram of a contour-effect image for target text according to an embodiment of the present disclosure.

In the embodiments of the present disclosure, the contour-effect image corresponding to the target text is obtained after pixels are drawn on the canvas based on the signed distance field image of the target text. The inner contour of the target text is not covered in the contour-effect image. Reference is made to FIG. 7, which is a schematic diagram of a contour-effect image corresponding to target text according to an embodiment of the present disclosure. As compared with the image shown in FIG. 5, the inner contour of the text shown in FIG. 7 is not covered and a better display effect is achieved.

In the method for processing a contour effect of text according to the embodiment of the present disclosure, in response to detecting in the signed distance field image of the target text, a pixel having the same position coordinates as a pixel in an image already drawn on a canvas, a distance field value of the pixel in the signed distance field image is compared with a distance field value of the pixel in the image already drawn on the canvas. In response to determining that the distance field value of the pixel in the signed distance field image is smaller, the pixel in the signed distance field image is drawn onto the canvas. A contour-effect image corresponding to the target text is finally generated based on pixels in the signed distance field image which are drawn onto the canvas. In the embodiments of the present disclosure, considering the characteristics that the feature that distance field values of pixels located in the interior region of the text are negative numbers, distance field values of pixels located in the exterior region of the text are positive numbers, and the distance field value of the pixel located in the interior region of the text is certainly less than the distance field value of the pixel located in the exterior region of the text, distance field values of pixels having a same position are compared to ensure that pixels having smaller distance field values are drawn onto the canvas, so as to generate a contour-effect image in which an inner contour of target text is not covered by an outer contour of other text, thereby improving the display effect of the target text.

In an embodiment, the contour of the target text may be processed to have a color-gradient effect. Pixels having distance field values greater than 0 are located in the exterior region of the text. Therefore, in the embodiments of the present disclosure, for each of pixels having distance field values greater than 0 in the signed distance field image, a gradient value of the pixel may be determined based on a dot product of offset coordinates of the pixel with a gradient-direction vector. The offset coordinate refers to a difference between position coordinates of the pixel and coordinates of a gradient origin. Then, a color value of the pixel is determined based on the gradient value and target gradient colors.

The target gradient colors usually include two colors, for example, white and black. The color-gradient effect refers to an effect of gradually changing from black to white or an effect of gradually changing from white to black. The gradient origin usually refers to a center point of the text body, and the gradient origin determines a point at which transition from one color to another among the target gradient colors occurs.

In another embodiment, the text body in the contour-effect image corresponding to the target text may be drawn to have a luminous effect. Specifically, pixels located in the interior region of the text are determined from the signed distance field image, that is, pixels having distance field values less than 0 are determined, before the contour-effect image corresponding to the target text is generated based on the pixels in the signed distance field image which are drawn onto the canvas. Then, color transparency values of the pixels having distance field values less than 0 are determined based on distance field values of the pixels. An absolute value of a distance field value of a pixel is inversely proportional to a color transparency value of the pixel. That is, a pixel having a larger distance field value corresponds to a smaller color transparency value. Then, the text body is drawn onto the canvas based on determined color transparency values of pixels, so as to realize the luminous effect of the text body.

In addition, in practice, the method for processing a contour effect of text according to the present disclosure may be realized by using a depth test function of a graphics processing unit GPU. Specifically, when the GPU detects in the signed distance field image of the target text that there is a pixel having the same position coordinates as a pixel on an image already drawn on the canvas, distance field values of the pixels having the same position coordinates are written as depth values into a depth buffer of the GPU. The written distance field values of the pixels having the same position coordinates are compared by using the depth test function after the depth test function is enabled.

After comparing the distance field values by using the depth test function, pixels having smaller distance field values among the pixels having the same position coordinates are drawn onto the canvas, to ensure that a color value of the pixel having a smaller distance field value is drawn at the position coordinates, thereby preventing the inner contour of the target text from being covered by the outer contour of other text.

It can be understood that the signed distance field image of the target text may be generated with any one of the methods for generating a signed distance field image as described above, so as to implement the method for processing a contour effect of text based on the signed distance field image of the target text.

It is founded that the distance field image is conducive to processing a luminous effect of text based on the distance field image.

In view of this, a method for processing a luminous effect of text is provided according to the present disclosure. First, in the signed distance field image of the target text, pixels having distance field values within a preset range are determined as target pixels corresponding to the target text. Then, color transparency values corresponding to the target pixels are determined based on the distance field values of the target pixels. For each of the target pixels, an absolute value of the distance field value of the target pixel is inversely proportional to the color transparency value of the target pixel. Finally, a luminous-effect image corresponding to the target text is drawn based on the color transparency values corresponding to the target pixels.

In the embodiments of the present disclosure, the color transparency values of the pixels are determined based on the inversely-proportional relationship between an absolute value of a distance field value of a pixel and a color transparency value of the pixel, so that pixels far from the contour of the text have smaller color transparency values and pixels close to the contour of the text have larger color transparency values, so as to realize the luminous effect of the text, which meets user requirements for text effect.

Figure 8:
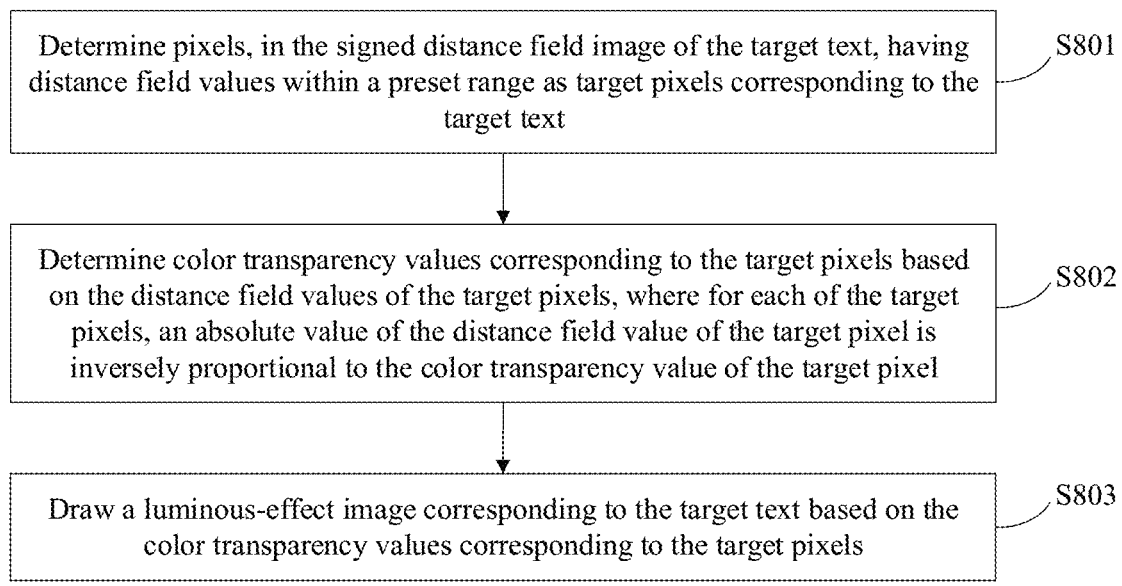
FIG. 8 is a flowchart of a method for processing a luminous effect for text according to an embodiment of the present disclosure.

A method for processing a luminous effect of text is provided according to an embodiment of the present disclosure based on this. Referring to FIG. 8, which is a flowchart of a method for processing a luminous effect of text according to an embodiment of the present disclosure. The method includes the following steps S801 to S803.

In step S801, in the signed distance field image of the target text, pixels having distance field values within a preset range are determined as target pixels corresponding to the target text.

In the embodiments of the present disclosure, the signed distance field image of the target text is obtained first. Then, pixels having distance field values within the preset range are determined based on distance field values of pixels in the signed distance field image, and the pixels having distance field values within the preset range are determined as the target pixels corresponding to the target text. The preset range may be determined based on requirements for setting the luminous effect of the text.

Figure 9:
FIG. 9 is a schematic diagram of an exterior-luminous-effect image for target text according to an embodiment of the present disclosure.

In an embodiment, to set an exterior-luminous effect for the target text, the target pixels may be pixels located in the exterior region of the target text, and the preset range is determined to be a range greater than 0 and less than a first preset value. The first preset value may be any value greater than 0. The first preset value indicates a luminous radius of the target text with an exterior-luminous effect. Reference is made to FIG. 9, which is a schematic diagram of an exterior-luminous-effect image for target text according to an embodiment of the present disclosure.

Figure 10:
FIG. 10 is a schematic diagram of an interior-luminous-effect image for target text according to an embodiment of the present disclosure.

In another embodiment, to set an interior-luminous effect for the target text, the target pixels may be pixels located in the interior region of the target text, and the preset range is determined to be greater than a second preset value and less than 0. The second preset value may be any value less than 0. The second preset value indicates a luminous radius of the target text with an interior-luminous effect. Reference is made to FIG. 10, which is a schematic diagram of an interior-luminous-effect image for target text according to an embodiment of the present disclosure.

Figure 11:
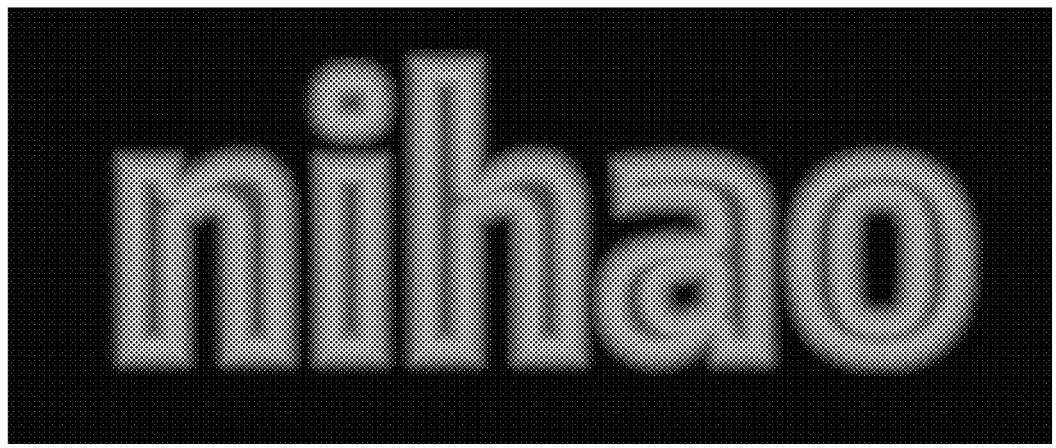
FIG. 11 is a schematic diagram of an interior-exterior-luminous-effect image for target text according to an embodiment of the present disclosure.

In another embodiment, to set both an interior-luminous effect and an exterior-luminous effect for the target text, the target pixels may include the pixels located in the interior region of the target text and the pixels located in the exterior region of the target text. Therefore, the preset range is determined to be less than a third preset value and greater than a fourth preset value. The third preset value is less than 0, and the fourth preset value is greater than 0. The third preset value indicates an interior-luminous radius of the target text with both the interior-luminous effect and the exterior-luminous effect. The fourth preset value indicates an exterior-luminous radius of the target text with both the interior-luminous effect and the exterior-luminous effect. Reference is made to FIG. 11, which is a schematic diagram of an interior-exterior-luminous-effect image for target text according to an embodiment of the present disclosure.

In the embodiments of the present disclosure, after the preset range is determined based on requirements for setting the luminous effect of the text, pixels having distance field values within the preset range are determined in the signed distance field image of the target text as the target pixels, and the target pixels serve as target objects in processing the luminous effect of the target text.

In step S802, color transparency values corresponding to the target pixels are determined based on the distance field values of the target pixels. For each of the target pixels, an absolute value of a distance field value of the target pixel is inversely proportional to a color transparency value of the target pixel.

In the embodiments of the present disclosure, a color transparency value of a pixel represents transparency of a color in which the pixel is drawn. A larger color transparency value indicates a higher transparency of the color in which the pixel is drawn, and a smaller color transparency value indicates a lower transparency of the color in which the pixel is drawn.

Color transparency values of pixels are determined based on distance field values of pixels. A larger absolute value of a distance field value of a pixel indicates a larger distance between the pixel and the text body, and accordingly the brightness and color transparency are lower. A smaller distance field value of the pixel indicates a smaller distance between the pixel and the text body, and accordingly the brightness and color transparency are higher.

Therefore, in the embodiments of the present disclosure, for each of the target pixels, an absolute value of a distance field value of the target pixel is set to be inversely proportional to a color transparency value of the target pixel. That is, a target pixel having a distance field value with a larger absolute value has a smaller color transparency value, and a target pixel having a distance field value with a smaller absolute value has a larger color transparency value, so as to achieve the luminous effect of the target text.

In the embodiments of the present disclosure, color transparency values corresponding to the target pixels are determined based on the distance field values of the target pixels after the inversely-proportional relationship between the absolute values of the distance field values and the color transparency values.

In an embodiment, in a case of the distance field value of the target pixel greater than 0, a ratio of the distance field value of the target pixel to a preset first luminous radius is determined, and a difference obtained by subtracting the ratio from 1 is determined as the color transparency value corresponding to the target pixel. In a case of the distance field value of the target pixel less than 0, a ratio of the distance field value of the target pixel to a preset second luminous radius is determined, and a sum of 1 and the ratio is determined as the color transparency value corresponding to the target pixel.

To set an exterior-luminous effect for the target text, the inversely-proportional relationship between a distance field value d and a color transparency value alpha may be expressed as alpha=1−d/D, where d is within a preset range [0, D]. In this case, D is positive and represents a luminous radius. To set an interior-luminous effect for the target text, a distance field value d is less than 0, so that the inverse proportional relationship between the absolute value of the distance field value d and the color transparency value alpha may be expressed as alpha=1−d/D, where d is within a preset range [D, 0]. In this case, D is negative and the absolute value of D represents a luminous radius. To set both the exterior-luminous effect and the interior-luminous effect for the target text, the color transparency values of the target pixels may be determined based on the above two manners.

In step S803, a luminous-effect image corresponding to the target text is drawn based on the color transparency values corresponding to the target pixels.

In the embodiments of the present disclosure, color values are set for the pixels in the signed distance field image of the target text, and the color transparency values corresponding to the target pixels are determined. Then the pixels are drawn on the canvas. Finally the luminous-effect image corresponding to the target text is obtained.

In an embodiment, a same color value, for example, red (255, 0, 0), may be set for the pixels, and the drawn luminous-effect image corresponding to the target text shows a red-luminous effect.

In another embodiment, a color-gradient effect may be set for the target text, and the drawn luminous-effect image corresponding to the target text shows a color-gradient and luminous effect.

In practice, for each of the target pixels, a dot product of position coordinates of the target pixel with a gradient-direction vector is determined as a gradient value corresponding to the target pixel before drawing the luminous-effect image corresponding to the target text. The gradient-direction vector is a color-gradient direction set based on requirements for gradient. Then, a color value of the target pixel is determined based on the gradient value of the target pixel, target gradient colors, and a target gradient position. The target gradient colors may include a first color value and a second color value, specifically a gradient from the first color value to the second color value. The target gradient position may be a preset gradient value or a preset gradient range. In a case that the target gradient position is a preset gradient value, a fast gradient from the first color value to the second color value occurs at a position corresponding to the preset gradient value. In a case that the target gradient position is a preset gradient range, a slow gradient from the first color value to the second color value occurs at positions corresponding to the preset gradient range.

In the embodiments of the present disclosure, the luminous-effect image corresponding to the target text is drawn based on the color values and the color transparency values of the target pixels after the color values corresponding to the target pixels are determined.

In the method for processing a luminous effect of text according to an embodiment of the present disclosure, pixels, in the signed distance field image of the target text, having distance field values within the preset range are determined as target pixels corresponding to the target text first. Then, color transparency values corresponding to the target pixels are determined based on the distance field values of the target pixels, where an absolute value of a distance field value of a target pixel is inversely proportional to a color transparency value of the target pixel. Finally, a luminous-effect image corresponding to the target text is drawn based on the color transparency values corresponding to the target pixels. In the embodiments of the present disclosure, the color transparency values of the pixels are determined based on the inversely-proportional relationship between an absolute value of a distance field value of a pixel and a color transparency value of the pixel, so that pixels far from the contour of the text have smaller color transparency values, and pixels close to the contour of the text have larger color transparency values, so as to realize the luminous effect of the text, which meets user requirements for text effect.

Figure 12:
FIG. 12 shows a schematic effect of defects of black lines at sharp corners between contours of adjacent characters according to an embodiment of the present disclosure.

In practice, it is founded that when a luminous effect of text including multiple characters is drawn, if applying an effect of fusing contours of adjacent characters, defects of black lines at sharp corners occur between the contours of the adjacent characters, resulting in a poor visual effect. Reference is made to FIG. 12, which is a schematic effect of defects of black lines at sharp corners occurring between contours of adjacent characters according to an embodiment of the present disclosure.

Figure 13:
FIG. 13 shows a schematic effect of no defect of black lines at sharp corners between contours of adjacent characters according to an embodiment of the present disclosure.

In order to avoid the defects of black lines at sharp corners, fusing of contours of adjacent characters is not applied when a luminous effect of text including multiple characters is drawn in the embodiments of the present disclosure. Therefore, in the method for processing a luminous effect of text according to an embodiment of the present disclosure, in drawing a luminous-effect image corresponding to the target text, target pixels are drawn, based on color transparency values corresponding to the target pixels, onto a canvas already drawn with an image. Then, a luminous-effect image corresponding to the target text is generated based on the drawing of the target pixels on the canvas. Reference is made to FIG. 13, which is a schematic effect of no defect of black lines at sharp corners between contours of adjacent characters according to an embodiment of the present disclosure.

Specifically, the target pixels are drawn on pixels in the already-drawn image to cover the already-drawn pixels without processing a contour-fusion effect, so as to avoid defects of black lines at sharp corners in the luminous-effect image corresponding to the target text.

In fact, it is unnecessary to consider whether the already-drawn image on the canvas overlaps with the target pixels currently drawn when drawing the luminous-effect image corresponding to the target text, but to directly draw the target pixels on the canvas based on the color transparency values and the color values of the target pixels.

Figure 14:
FIG. 14 shows a schematic effect of occurrence of black lines at sharp corners in an interior region of text according to an embodiment of the present disclosure.

In addition, it is founded that in the luminous-effect image drawn based on the method for processing a luminous effect of text according to the above embodiments, black lines at sharp corners may occur in the interior region of the text, as shown in FIG. 14, which is a schematic effect of black lines at sharp corners in an interior region of text according to an embodiment of the present disclosure.

In order to avoid black lines at sharp corners in the interior region of the text, Post-processing of Gaussian blur is performed on the signed distance field image of the target text before determining the target pixels corresponding to the target text.

The distance field values of the pixels in the signed distance field image change after the Post-processing of Gaussian blur is performed on the signed distance field image of the target text, so as to realize an interior-smoothing effect of the text.

In practice, the Post-processing of Gaussian blur is performed on the signed distance field image of the target text after the signed distance field image is obtained. Then, the target pixels corresponding to the target text are determined based on the signed distance field image subjected to Post-processing of Gaussian blur. Finally the luminous-effect image for the target text is drawn.

Figure 15:
FIG. 15 is a schematic diagram of a luminous-effect image, for target text, drawn based on a signed distance field image subjected to Post-processing of Gaussian blur according to an embodiment of the present disclosure.

The Post-processing of Gaussian blur causes changes of the distance field values of the pixels in the signed distance field image, so as to realize an interior-smoothing effect of the text. Therefore, the luminous-effect image for the target text drawn based on the signed distance field image subjected to Post-processing of Gaussian blur can avoid black lines at sharp corners in the target text in the luminous-effect image. Reference is made to FIG. 15, which is a schematic diagram of a luminous-effect image, for target text, drawn based on a signed distance field image subjected to Post-processing of Gaussian blur according to an embodiment of the present disclosure.

In the embodiments of the present disclosure, in the process of drawing the luminous-effect image for the target text based on the distance field image, it is required to traverse each pixel only once to complete the drawing of the luminous-effect image. An efficiency of drawing the luminous-effect image can be improved as compared with the conventional method requiring multiple loop traversals.

It can be understood that the signed distance field image of the target text may be generated with any of the forgoing methods for generating a signed distance field image, so as to implement the method for processing a luminous effect of text based on the signed distance field image of the target text.

An effect processing method is further provided according to an embodiment of the present disclosure. First, a distance field image of a to-be-processed object, and a first effect distance field image are obtained. Then, a sum of a distance field value of a pixel in the distance field image of the to-be-processed object and a distance field value of a pixel in the first effect distance field image located at same position coordinates as the pixel in the distance field image are calculated, and the sum is determined as a distance field value of a pixel located at the same position coordinates in a first target distance field image. Finally, a first target effect image for the to-be-processed object is drawn based on distance field values of pixels in the first target distance field image.

In the present disclosure, the effect processing of the to-be-processed object can be achieved based on superimposition of the distance field values in the distance field image of the to-be-processed object and the distance field values in the effect distance field image, for pixels at same positions, thereby meeting user's requirements for effect processing.

Figure 16:
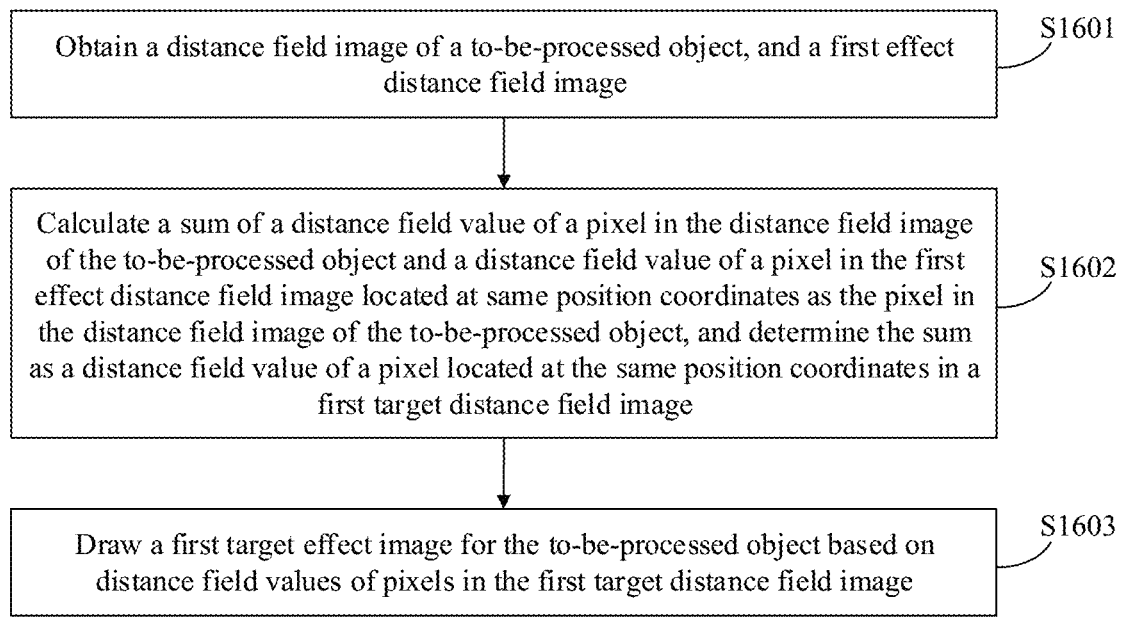
FIG. 16 is a flowchart of an effect processing method according to an embodiment of the present disclosure.

An effect processing method is provided according to an embodiment of the present disclosure Based on this. Referring to FIG. 16, which is a flowchart of an effect processing method according to an embodiment of the present disclosure, the method includes the following steps S1601 to S1603.

In step S1601, a distance field image of a to-be-processed object, and a first effect distance field image are obtained.

The to-be-processed object in the embodiments of the present disclosure may be target text, a target image, or the like. Specifically, the distance field image of the to-beprocessed object is obtained first before effect processing is performed on the to-be-processed object.

In addition, it is further to obtain the first effect distance field image for the effect processing before performing effect processing on the to-be-processed object. The first effect distance field image may be a distance-field-image frame from a distance-field-image sequence.

Specifically, the distance-field-image sequence may include multiple continuous distance-field-image frames generated based on a preset transformation rule. The preset transformation rule includes sine transformation, cosine transformation, a pulse curve or the like.

In addition, the distance-field-image sequence may further include multiple continuous distance-field-image frames for noise effects.

In addition, the first effect distance field image may be a distance field image generated based on a preset image, for example, a distance field image generated based on an image frame in a flame-animation sequence.

In step S1602, a sum of a distance field value of a pixel in the distance field image of the to-be-processed object and a distance field value of a pixel in the first effect distance field image located at same position coordinates as the pixel in the distance field image of the to-be-processed object are calculated, and the sum is determined as a distance field value of a pixel having the same position coordinates in a first target distance field image.

In the embodiments of the present disclosure, a pixel in the distance field image of the to-be-processed object and a pixel in the first effect distance field image located at same position coordinates as the pixel in the distance field image of the to-be-processed object are determined, after the distance field image of the to-be-processed object and the first effect distance field image are obtained. Hereinafter the pixel in the distance field image of the to-be-processed object is referred to as a first pixel, and the pixel in the first effect distance field image is referred to as a second pixel. Then, a sum of a distance field value of the first pixel and a distance field value of the second pixel is calculated, and the sum is determined as a distance field value of a pixel (also referred to as a third pixel) having the same position coordinates in the first target distance field image.

For example, the distance field value of the first pixel is determined as X and the distance field value of the second pixel is determined as Z, so that the distance field value of the third pixel is equal to X+Y.

In practice, for each of the pixels, a sum of a distance field value of the pixel in the distance field image of the to-be-processed object and a distance field value of the pixel in the first effect distance field image located at same position coordinates is calculated in this manner, and the sum is determined as a distance field value of a pixel at the same position coordinates in the first target distance field image.

In this manner, the distance field value of each pixel in the first target distance field image is determined, i.e., to be a sum of a distance field value of a pixel at a corresponding position in the distance field image of the to-be-processed object and a distance field value of a pixel at a corresponding position in the first effect distance field image.

In step S1603, a first target effect image for the to-be-processed object is drawn based on distance field values of pixels in the first target distance field image.

In the embodiments of the present disclosure, the first target effect image for the to-be-processed object is drawn based on the distance field values of the pixels in the first target distance field image after the distance field values of the pixels in the first target distance field image are determined.

In an embodiment, a distance field value of a pixel refers to a shortest distance between the pixel and a contour of the to-be-processed object. Therefore, a color value of a pixel may be determined based on a distance field value of the pixel, and then the first target effect image for the to-be-processed object is drawn based on color values of pixels.

Specifically, correspondence between distance field values and color values may be predetermined, and then color values corresponding to distance field values of pixels in the first target distance field image are determined as color values of the pixels based on the correspondence.

In an embodiment, correspondence between color values and distance-field-value ranges may be predetermined. For example, a color value corresponding to a distance-field-value range [−m, n] (m and n are arbitrary values, and for example, m is equal to 0.8 and n is equal to 0) is white. A color value corresponding to a distance-field-value range [j, k] (j and k are arbitrary values, for example, j is equal to 0 and k is equal to 1) is yellow. Then, color values corresponding to distance field values of the pixels in the first target distance field image are determined as the color values of the pixels based on the correspondence.

In another embodiment, in a case that the to-be-processed object is target text, the body of the target text may be drawn with a gradient color to enhance a display effect of the target text. Specifically, pixels having distance field values less than 0 is located in the interior region of the target text, so that pixels having distance field values less than 0 in the first target distance field image are determined as first target pixels in the embodiments of the present disclosure. Then, for each of the first target pixels, a gradient value of the first target pixel is determined based on a dot product of offset coordinates of the first target pixel with a gradient-direction vector. The offset coordinates represent a difference between position coordinates of the first target pixel and coordinates of a gradient origin. Further, a color value of the first target pixel is determined based on the gradient value of the first target pixel and target gradient colors. Finally, the first target effect image of the to-be-processed object is drawn based on color values of the first target pixels.

The target gradient colors usually include two colors, for example, white and black. The color-gradient effect refers to an effect of gradually changing from black to white or an effect of gradually changing from white to black. The gradient origin usually refers to a center point of the text body, and the gradient origin determines a point at which transition from one color to another among the target gradient colors occurs.

In practice, a range of the gradient value may be set to be from 0 to 1. The gradient values of the first target pixels are within a range from 0 to 1 in the embodiments of the present disclosure. The target gradient colors include white and black, so that white may correspond to 0 and black may correspond to 1. Accordingly, the gradient value of the first target pixel may correspond to a color value between white and black, and the color value may be determined as a color value of the first target pixel.

In another embodiment, in a case that the to-be-processed object is target text, the body of the target text may be drawn to have a luminous effect, to enhance a display effect of the target text. Specifically, pixels having distance field values less than 0 is located in the interior region of the target text, so that the pixels, having distance field values less than 0, in the first target distance field image are determined as second target pixels in the embodiments of the present disclosure. Then, color transparency values of the second target pixels are determined based on the distance field values of the second target pixels. For each of the second target pixels, an absolute value of a distance field value of the second target pixel is inversely proportional to a color transparency value of the second target pixel. Finally, the first target effect image for the to-be-processed object is drawn based on the color transparency values of the second target pixels.

In the embodiments of the disclosure, the body of the target text is drawn by setting inversely-proportional relationship between an absolute value of a distance field value and a color transparency value, so as to realize a luminous effect of the text body.

In the effect processing method according to an embodiment of the present disclosure, a distance field image of a to-be-processed object, and a first effect distance field image are obtained first. Then, a sum of a distance field value of a pixel in the distance field image of the to-be-processed object and a distance field value of a pixel in the first effect distance field image located at same position coordinates as the pixel in the distance field image of the to-be-processed object are calculated, and the sum is determined as a distance field value of a pixel having the same position coordinates in a first target distance field image. Finally, a first target effect image for the to-be-processed object is drawn based on distance field values of pixels in the first target distance field image. In the embodiments of the present disclosure, the effect of the to-be-processed object can be processed based on superimposition of the distance field values in the distance field image of the to-be-processed object and the distance field values in the effect distance field image, for pixels at same positions, thereby meeting user's requirements for effect processing.

Figure 17:
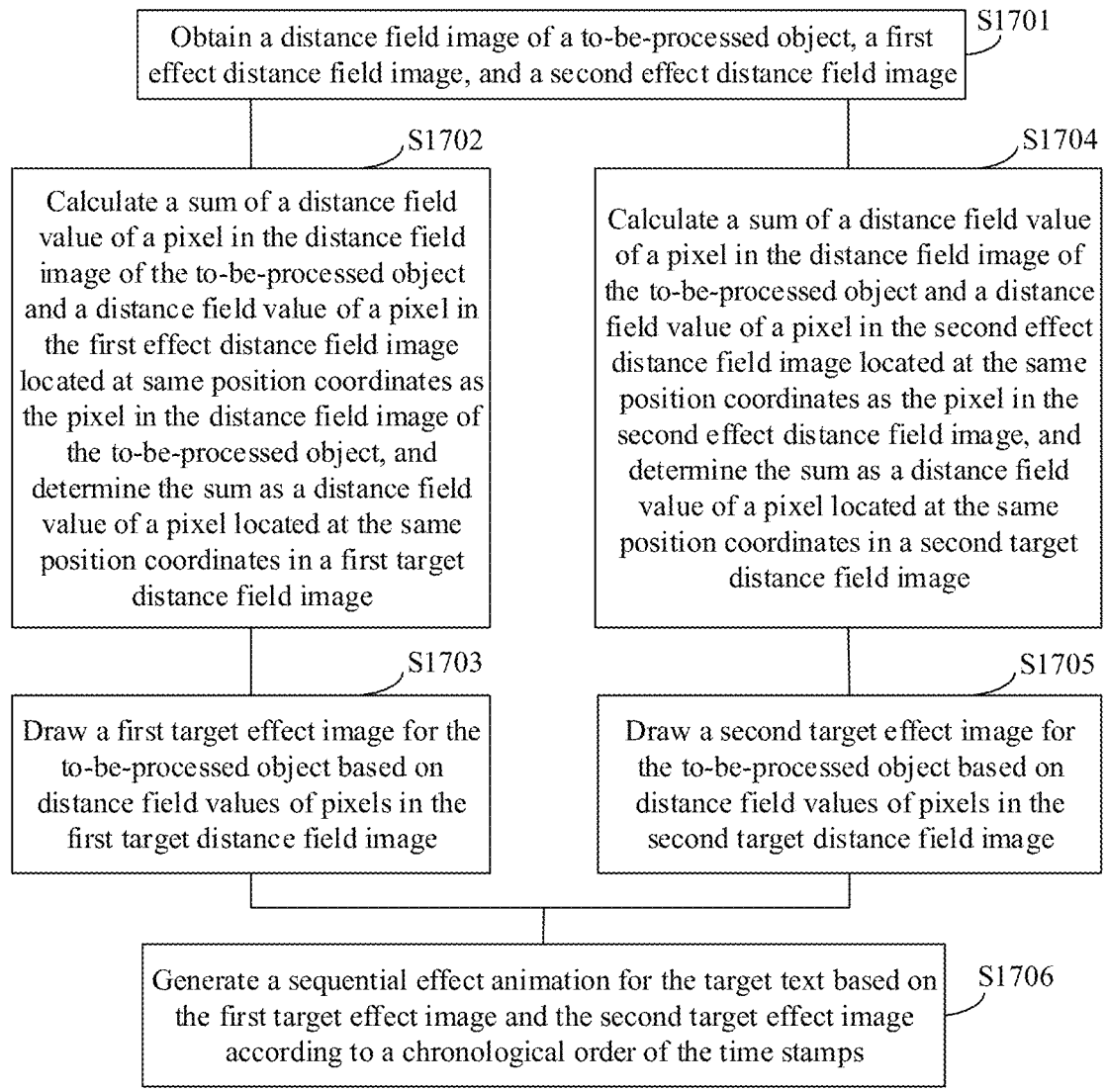
FIG. 17 is a flowchart of a dynamic-effect processing method according to an embodiment of the present disclosure.

A dynamic-effect processing method is further provided according to an embodiment of the present disclosure based on the above embodiments. Referring to FIG. 17, which is a flowchart of a dynamic-effect processing method according to an embodiment of the present disclosure, the method includes the following step S1701 to S1706.

In step S1701, a distance field image of a to-be-processed object, a first effect distance field image, and a second effect distance field image are obtained.

In the embodiments of the present disclosure, the first effect distance field image and the second effect distance field image are from a distance-field-image sequence, and have different time stamps. The distance-field-image sequence includes images successively played in a chronological order.

Specifically, the first effect distance field image and the second effect distance field image each may be an image frame selected from multiple consecutive distance-field-image frames generated based on a preset transformation rule. The preset transformation rule may be sine transformation, cosine transformation or a pulse curve. For example, the first effect distance field image may be the first image frame played at the first second in a distance-field-image sequence of 20 seconds, and the second effect distance field image may be the tenth image frame played at the tenth second in the distance-field-image sequence.

In this manner, each image frame in the distance-field-image sequence may serve as the first effect distance field image or the second effect distance field image, to be used in effect processing for the to-be-processed object.

In step S1702, a sum of a distance field value of a pixel in the distance field image of the to-be-processed object and a distance field value of a pixel in the first effect distance field image located at same position coordinates as the pixel in the distance field image of the to-be-processed object are calculated, and the sum is determined as a distance field value of a pixel having the same position coordinates in a first target distance field image.

In step S1703, a first target effect image for the to-be-processed object is drawn based on distance field values of pixels in the first target distance field image.

For understanding of steps S1702 and S1703 in the embodiments of the present disclosure, reference may be made to the description of steps S1602 and S1603 in the above embodiments, which is not repeated here.

In step S1704, a sum of a distance field value of a pixel in the distance field image of the to-be-processed object and a distance field value of a pixel in the second effect distance field image located at same position coordinates as the pixel in the distance field image of the to-be-processed object are calculated, and the sum is determined as a distance field value of a pixel having the same position coordinates in a second target distance field image.

In the embodiments of the present disclosure, a pixel in the distance field image of the to-be-processed object and a pixel in the second effect distance field image located at same position coordinates as the pixel in the distance field image of the to-be-processed object are determined, after the distance field image of the to-be-processed object and the second effect distance field image are obtained. Hereinafter the pixel in the distance field image of the to-be-processed object is referred to as a fourth pixel, and the pixel in the second effect distance field image is referred to as a fifth pixel. Then, a sum of a distance field value of the fourth pixel and a distance field value of the fifth pixel is calculated, and the sum is determined as a distance field value of a pixel (also referred to as a sixth pixel) having the same position coordinates in the second target distance field image.

In practice, for each of the pixels, a sum of a distance field value of the pixel in the distance field image of the to-be-processed object and a distance field value of the pixel in the second effect distance field image located at same position coordinates is calculated in this manner, and the sum is determined as a distance field value of a pixel at the same position coordinates in the second target distance field image.

The distance field value of each pixel in the second target distance field image is determined in the above manner, which is a sum of a distance field value of a pixel at a corresponding position in the distance field image of the to-be-processed object and a distance field value of a pixel at the corresponding position in the second effect distance field image.

In step S1705, a second target effect image for the to-be-processed object is drawn based on distance field values of pixels in the second target distance field image.

In the embodiments of the present disclosure, the second target effect image for the to-be-processed object is drawn based on the distance field values of the pixels in the first target distance field image after the distance field values of the pixels in the second target distance field image are determined.

In step S1706, a sequential effect animation for the to-be-processed object is generated based on the first target effect image and the second target effect image according to time stamps in the distance-field-image sequence.

In the embodiments of the present disclosure, the sequential effect animation for the to-be-processed object is generated according to the time stamps in the distance-field-image sequence to which the first effect distance field image and the second effect distance field image belong after the first target effect image and the second target effect image for the to-be-processed object are drawn.

In practice, an effect image for the to-be-processed object may generated based on each distance-field-image frame in the distance-field-image sequence to which the first effect distance field image and the second effect distance field image belong. Then effect images respectively corresponding to distance-field-image frames in the distance-field-image sequence are combined based on the time stamps in the distance-field-image sequence, so that the effect images respectively corresponding to the distance-field-image frames are successively displayed in a chronological order, and finally the sequential effect animation for the to-be-processed object is generated.

The sequential effect animation is played according to the time stamps, so as to show a dynamic effect of the to-be-processed object.

Figure 18:
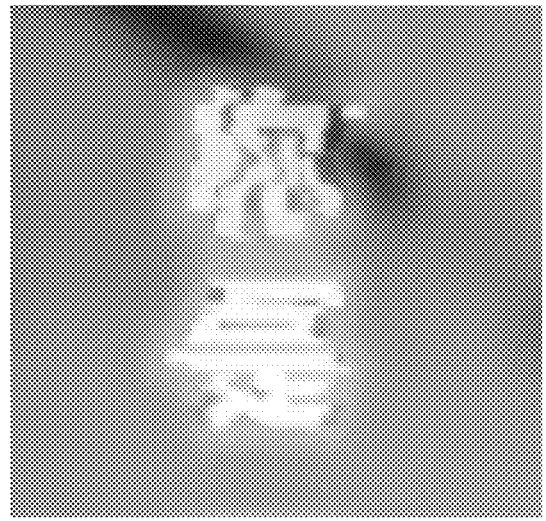
FIG. 18 is a schematic diagram of an effect-image frame in a sequential effect animation according to an embodiment of the present disclosure.

For example, the distance-field-image sequence may include distance field images respectively corresponding to image frames in a flame-burning animation. A sequential effect animation with a dynamic effect can be obtained by performing effect processing on target text based on the distance-field-image sequence. Reference is made to FIG. 18, which is a schematic diagram of an effect-image frame in a sequential effect animation according to an embodiment of the present disclosure.

In the dynamic-effect processing method according to the embodiments of the present disclosure, effect processing is performed on the to-be-processed object based on the effect distance field images of a same distance-field-image sequence. Then, the effect images obtained through the effect processing are combined. Finally a sequential effect animation for displaying the to-be-processed object with a dynamic effect is generated, thereby meeting user's requirement for dynamic-effect display.

At present, a shadow effect of text is usually drawn based on bitmap text. A distance field image of text records a minimum distance from each of pixels located in an interior region and an exterior region of the text to a contour (also referred to as a boundary) of the text, where the minimum distance is also referred to as a distance field value. Distance field values of pixels located in the interior region of the text are set to be negative numbers, and distance field values of pixels located in the exterior region of the text are set to be positive numbers. It is founded that the signed distance field image of text is conducive to drawing a shadow effect of the text.

In view of this, a method for processing a shadow effect of text is provided according to an embodiment of the present disclosure. First, position offset is performed on pixels in the signed distance field image of the target text to obtain a first distance field image. The first distance field image includes original pixels and offset pixels obtained after the original pixels are subjected to position offset. Then, an initial interior-shadow-effect image corresponding to the target text is drawn based on the first distance field image. A target region composed of offset pixels, in the first distance field image, having distance field values greater than a preset value is determined, and the target region is removed from the initial interior-shadow-effect image to obtain an interior-shadow-effect image for the target text. In the present disclosure, by utilizing the characteristics that pixels having distance field values greater than the preset value in the signed distance field image of the target text are located in the exterior region of the target text, the target region composed of pixels located in the exterior region of the target text is removed, so as to draw the interior-shadow-effect of the target text.

Figure 19:
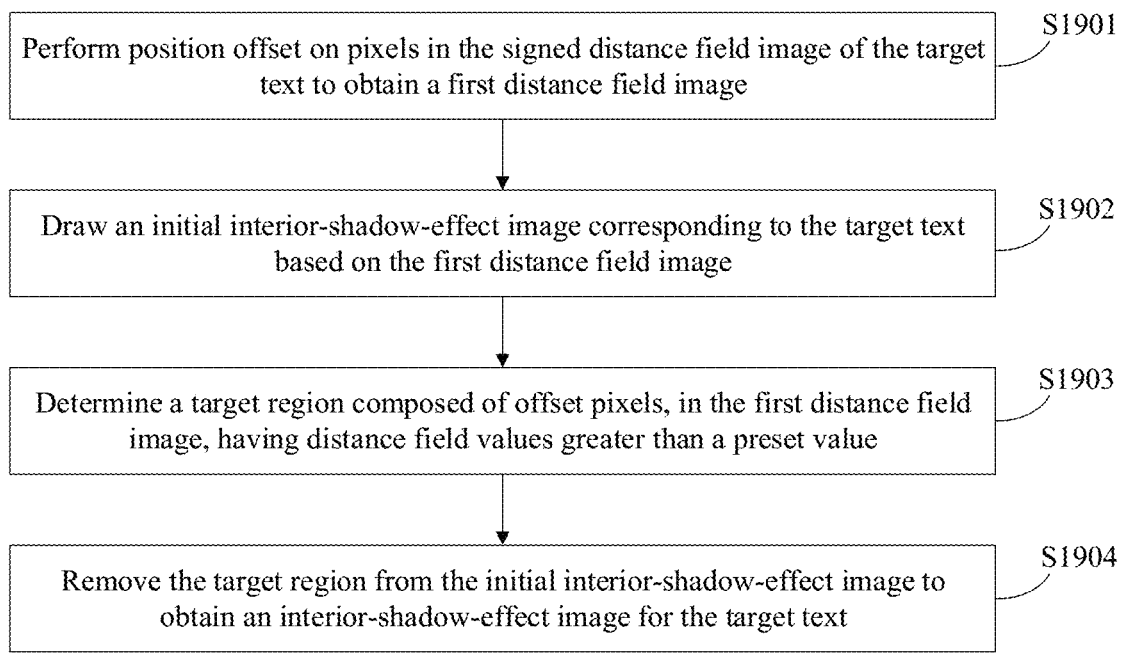
FIG. 19 is a flowchart of a method for processing a shadow effect of text according to an embodiment of the present disclosure.

A method for processing a shadow effect of text is provided according to an embodiment of the present disclosure based on this. Referring to FIG. 19, which is a flowchart of a method for processing a shadow effect of text according to an embodiment of the present disclosure, the method includes the following steps S1901 to S1904.

In step S1901, position offset is performed on pixels in the signed distance field image of the target text to obtain a first distance field image. The first distance field image includes original pixels and offset pixels obtained after the original pixels are subjected to position offset.

In the embodiments of the present disclosure, an offset vector for the shadow effect is predetermined. The offset vector represents an offset direction and an offset distance of the shadow effect. For example, the offset vector may be expressed as (shadowOffsetX, shadowOffsetY), where shadowOffsetX represents an offset distance of the shadow effect relative to the text body in an x-axis direction, and shadowOffsetY represents an offset distance of the shadow effect relative to the text body in a y-axis direction.

In practice, for any pixel (x, y) in the signed distance field image of the target text, position offset is performed based on the offset vector (shadowOffsetX, shadowOffsetY), to obtain an offset pixel (x-shadowOffsetX, y-shadowOffsetY) subjected to position offset. The pixel (x, y) represents an original pixel, and the pixel (x-shadowOffsetX, y-shadowOffsetY) represents an offset pixel corresponding to the original pixel (x, y). The first distance field image including the original pixels and the offset pixels is obtained after all pixels in the signed distance field image of the target text are subjected to position offset.

In step S1902, an initial interior-shadow-effect image corresponding to the target text is drawn based on the first distance field image.

In the embodiments of the present disclosure, after the first distance field image is determined, the initial interior-shadow-effect image corresponding to the target text is drawn based on distance field values of the original pixels and the offset pixels in the first distance field image.

In an embodiment, the body of the target text may be drawn first based on the original pixels in the first distance field image. After the body of the target text is drawn, an interior shadow of the body of the target text is initially drawn based on the offset pixels in the first distance field image to obtain the initial interior-shadow-effect image corresponding to the target text. By controlling an order of drawing layers, the text body is drawn under the shadow, so that the text body is covered by the shadow, thereby realizing an interior-shadow effect of the text body.

In practice, color values of the original pixels may be determined before the text body is drawn. Then the text body of the target text is drawn based on the color values of the original pixels. In addition, color values of the offset pixels may be determined before the interior shadow of the text body of the target text is drawn. Then the interior shadow of the text body of the target text is drawn based on the color values of the offset pixels to obtain the initial interior-shadow-effect image corresponding to the target text. The text body and the interior shadow can be drawn in colors in the above manner.

In addition, in a case that each of the original pixel and the offset pixel at the same position in the first distance field image has its own color transparency value, color-mix may be achieved for the original pixel and the offset pixel at the same position based on the color transparency values. A manner in which the colors are mixed based on the color transparency values is not limited in the present disclosure.

In an embodiment, the text body in the initial interior-shadow-effect image corresponding to the target text may be drawn to have a luminous effect. Specifically, for each original pixel in the first distance field image, a color transparency value of the original pixel is determined based on a distance field value of the original pixel before drawing the text body. A distance field value of an original pixel is inversely proportional to a color transparency value of the original pixel. That is, pixels far from the text body have lower color transparency, so as to realize a luminous effect of the text. Then, the text body of the target text is drawn based on the color transparency values of the original pixels.

In another embodiment, the interior-shadow effect in the initial interior-shadow-effect image corresponding to the target text may be drawn to have a color-gradient effect. Specifically, before the interior shadow of the target text is drawn, for each of offset pixels in the first distance field image, a gradient value of the offset pixel is determined based on a dot product of offset coordinates of the offset pixel with a gradient-direction vector. The offset coordinates represent a difference between position coordinates of the offset pixel and coordinates of a gradient origin. Then, a color value of the offset pixel is determined collectively from the gradient value and target gradient colors. Then, the interior shadow of the target text is drawn based on color values of the offset pixels.

The target gradient colors usually include two colors, for example, white and black. The color-gradient effect refers to an effect of gradually changing from black to white or an effect of gradually changing from white to black. The gradient origin usually refers to a center point of the text body, and the gradient origin determines a point at which transition from one color to another among the target gradient colors occurs.

In step S1903, a target region composed of offset pixels, in the first distance field image, having distance field values greater than a preset value is determined.

The preset value may be set based on requirements for the interior-shadow effect. Specifically, the preset value may be equal to 0, or equal to a value between 0 and 0.5.

Figure 20:
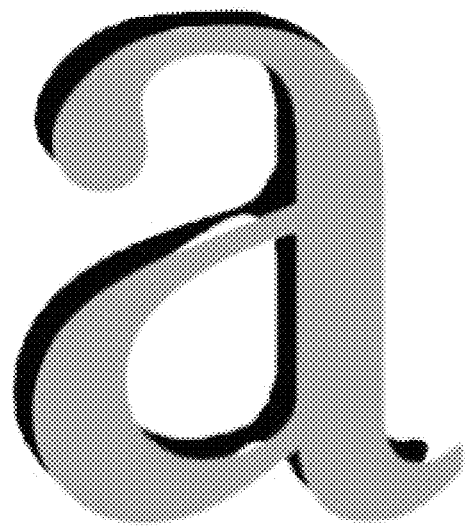
FIG. 20 is a schematic diagram of an initial interior-shadow-effect image according to an embodiment of the present disclosure.

In the embodiments of the present disclosure, the interior-shadow-effect image drawn based on the offset pixels in the first distance field image includes a region not overlapping with the text body, as shown in FIG. 20, which is a schematic diagram of an initial interior-shadow-effect image according to an embodiment of the present disclosure. In order to ensure an interior-shadow effect of the target text, it is required to remove the region not overlapping with the text body.

In the embodiments of the present disclosure, the target region composed of offset pixels, in the first distance field image, having distance field values greater than the preset value (for example, 0) is determined based on the characteristics that pixels located in the exterior region of the text have negative distance field values in the signed distance field image.

In step S1904, the target region is removed from the initial interior-shadow-effect image to obtain an interior-shadow-effect image for the target text.

In the embodiments of the present disclosure, the target region is composed of offset pixels having distance field values greater than the preset value. The offset pixels having distance field values greater than the preset value are located in the exterior region of the target text. In order to realize the interior-shadow effect of the target text, it is required to remove the offset pixels that are located in the exterior region of the target text and have distance field values greater than the preset value.

Figure 21:
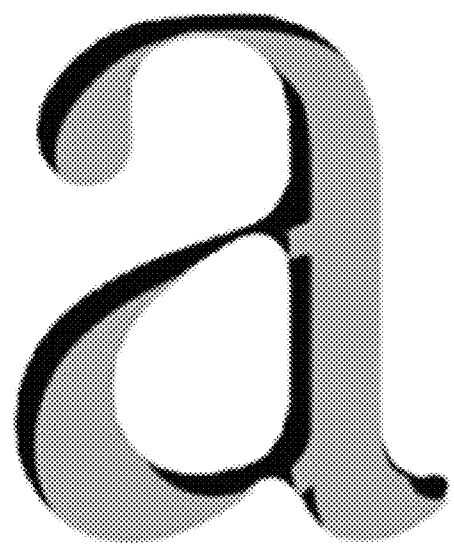
FIG. 21 is a schematic diagram of an interior-shadow-effect image for target text according to an embodiment of the present disclosure.

In view of this, in the embodiments of the present disclosure, the target region is removed from the initial interior-shadow-effect image after the target region is determined, so as to ensure that there is no region overlapping with the text body in the final interior-shadow-effect image, thereby ensuring the interior-shadow effect of the target text. FIG. 21 is a schematic diagram of an interior-shadow-effect image for target text according to an embodiment of the present disclosure.

In the method for processing a shadow effect of text according to an embodiment of the present disclosure, position offset is first performed on pixels in the signed distance field image of the target text to obtain a first distance field image. The first distance field image includes original pixels and offset pixels obtained after the original pixels are subjected to position offset. Then, an initial interior-shadow-effect image corresponding to the target text is drawn based on the first distance field image. A target region composed of offset pixels, in the first distance field image, having distance field values greater than a preset threshold is determined, and the target region is removed from the initial interior-shadow-effect image to obtain an interior-shadow-effect image for the target text. In the embodiments of the present disclosure, based on the characteristics that pixels having distance field values greater than the preset value in the signed distance field image of the target text are located in the exterior region of the target text the target region composed of pixels located in the exterior region of the target text is removed, so as to draw the interior-shadow effect of the target text.

A method for processing an exterior-shadow effect of target text is further provided according to an embodiment of the present disclosure. Specifically, an exterior-shadow-effect image corresponding to the target text is drawn based on the first distance field image, where the exterior-shadow effect may be drawn in the way of drawing the exterior shadow and then drawing the text body.

Figure 22:
FIG. 22 is a schematic diagram of an exterior-shadow-effect image corresponding to target text according to an embodiment of the present disclosure.

In an embodiment, the exterior shadow of the target text is drawn first based on the offset pixels in the first distance field image. Then, the text body of the target text is drawn based on the original pixels in the first distance field image to obtain the exterior-shadow-effect image corresponding to the target text. Reference is made to FIG. 22, which is a schematic diagram of an exterior-shadow-effect image corresponding to target text according to an embodiment of the present disclosure.

By controlling an order of drawing layers, the text body is drawn above the shadow, so that the shadow is covered by the text body, thereby realizing an effect that the text body has an exterior shadow.

It should be noted that the offset vector and the offset distance used in the position offset of the pixels in the first distance field image for drawing the exterior-shadow-effect image corresponding to the target text may be different from those for drawing the interior-shadow.

In an embodiment, when drawing the exterior-shadow effect of the target text, the text body in the initial exterior-shadow-effect image corresponding to the target text may be drawn to have a luminous effect. Specifically, before drawing the text body, for each original pixel in the first distance field image, a color transparency value of the original pixel is determined based on the distance field value of the original pixel. The distance field value is inversely proportional to the color transparency value. That is, pixels far from the text body have lower color transparency, so as to realize a luminous effect of the text. Then, the text body of the target text is drawn based on color transparency values of the original pixels.

In another embodiment, an exterior-shadow effect in the initial exterior-shadow-effect image corresponding to the target text may be drawn to have a color-gradient effect. Specifically, before drawing the exterior shadow of the target text, for each of offset pixels in the first distance field image, a gradient value of the offset pixel is determined based on a dot product of offset coordinates of the offset pixel with a gradient-direction vector. The offset coordinates represent a difference between position coordinates of the offset pixel and coordinates of a gradient origin. Then, a color value of the offset pixel is determined collectively from the gradient value and target gradient colors. Then, the exterior shadow of the target text is drawn based on color values of the offset pixels.

In the method for processing a shadow effect of text according to the embodiments of the present disclosure, not only the interior-shadow effect but also the exterior-shadow effect of the target text can be drawn based on the signed distance field image of the target text, which meets user's requirements for processing a shadow effect of text.

It is founded that the distance field image is conductive to processing a color-gradient effect of an object.

In view of this, a method for processing a color-gradient effect is provided according to an embodiment of the present disclosure. First, gradient values corresponding to target pixels are determined based on position information of the target pixels and a gradient-direction vector. Then color values of the target pixels are determined based on the gradient values corresponding to the target pixels, target gradient colors, and a target gradient position. Finally, a color-gradient-effect image corresponding to the target object is drawn based on the color values of the target pixels.

In the embodiments of the present disclosure, the color values are determined based on the position information of the target pixels, so as to draw the color-gradient-effect image of the target object. It can be seen that in the embodiments of the present disclosure, the color-gradient effect of the target object can be realized, thereby meeting user's requirements for effect processing.

Figure 23:
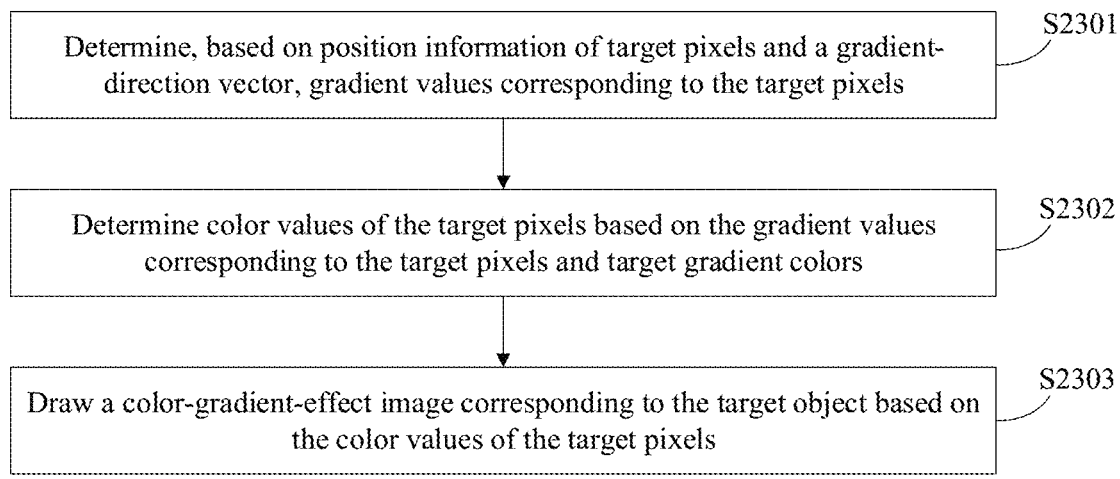
FIG. 23 is a flowchart of a method for processing a color-gradient effect according to an embodiment of the present disclosure.

A method for processing a color-gradient effect is provided according to an embodiment of the present disclosure based on this. Referring to FIG. 23, which is a flowchart of a method for processing a color-gradient effect according to an embodiment of the present disclosure, the method includes the following steps S2301 to S2303.

In step S2301, gradient values corresponding to target pixels are determined based on position information of the target pixels and a gradient-direction vector. The gradient-direction vector represents a direction of color gradient.

In the embodiments of the present disclosure, position information of a target pixel refers to texture coordinates of the target pixel in the signed distance field image, which is assumed to be (x, y). The gradient-direction vector is usually a unit vector that is set based on requirements for color gradient and indicates a direction of color gradient, which is assumed to be (dx, dy). For example, the direction of color gradient may be a direction from left to right, a direction from top to bottom, or the like.

In the embodiments of the present disclosure, after the texture coordinates (x, y) of the target pixel are determined, a direction vector (x-x0, y-y0) pointing from texture coordinates (x0, y0) of a center point of the target object to the texture coordinates (x, y) is determined. Then a dot produc (x-x0, y-y0) dot (dx, dy) of the direction vector (x-x0, y-y0) with the gradient-direction vector (dx, dy) is determined as the gradient value corresponding to the target pixel.

In an embodiment, the gradient-direction vector may be determined by the user. That is, the user may adjust the gradient direction of the color-gradient effect in the color-gradient-effect image corresponding to the target object. Specifically, the user may determine the gradient-direction vector through an angle of a rotatable slider.

In practice, a selected angle of the rotatable slider is determined when an angle-selection operation performed by the user on the rotatable slider is received. Then a gradient-direction vector corresponding to the selected angle is determined. For example, in a case that the user adjusts the angle of the rotatable slider to be 180°, it may be determined that the gradient-direction vector is (1, 0), indicating that the gradient direction is from left to right.

In practice, the target pixels are determined before step S2301. Specifically, pixels, in the signed distance field image of the target object, having distance field values within a preset range may be determined as the target pixels corresponding to the target object.

In the embodiments of the present disclosure, the target object may be target text, a target image, or the like. Specifically, a distance field image of the target object is obtained before processing a color-gradient effect for the target object.

In practice, the signed distance field image of the target object is obtained first. Then, pixels having distance field values within the preset range are determined based on distance field values of pixels in the signed distance field image, and the pixels having distance field values within the preset range are determined as the target pixels corresponding to the target object. The preset range may be determined based on requirements for a color-gradient effect of the target object.

The color-gradient effect of the target text is usually displayed in the exterior region of the target object. Therefore, the preset range may be set to be a range greater than 0 and less than a preset value, so that pixels that are located in the exterior region of the target object and have distance field values greater than 0 are determined as the target pixels, so as to realize the exterior-color-gradient effect of the target object.

In step S2302, color values of the target pixels are determined based on the gradient values corresponding to the target pixels and target gradient colors.

In the embodiments of the present disclosure, the target gradient colors may include a first target color and a second target color, specifically gradually changing from the first target color to the second target color.

In an embodiment, a range of the gradient values may be set to be from a preset first boundary value to a preset second boundary value. Accordingly, the gradient values corresponding to the target pixels in the embodiments of the present disclosure are within the range from the preset first boundary value to the preset second boundary value. In addition, the target gradient colors usually include a first target color and a second target color. A gradient value corresponding to the first target color may be set to be the preset second boundary value, for example, 1, and a gradient value corresponding to the second target color may be set to be the preset first boundary value, for example, 0.

Specifically, the color values of the target pixels may be determined based on the gradient values corresponding to the target pixels, the target gradient colors, the preset first boundary value and the preset second boundary value.

In an embodiment, the preset first boundary value is equal to 0, the preset second boundary value is equal to 1, and the gradient values are within a range from 0 to 1. For each of the target pixels, a product of a gradient value corresponding to the target pixel and a color value of the first target color is first calculated as a first value. A difference between 1 and the gradient value corresponding to the target pixel is calculated, a product of the difference and a color value corresponding to the second target color is determined as a second value. Finally, a sum of the first value and the second value is determined as a color value of the target pixel.

Assuming that the first target color is green, a color value of the first target color is (0, 1, 0), and a gradient value corresponding to the target pixel is v, so that the first value is expressed as v*(0, 1, 0). Assuming that the second target color is red and a color value of the second target color is (1, 0, 0), so that the second value is expressed as (1−V)*(1, 0, 0). The first value and the second value are added to obtain a sum v*(0, 1, 0)+(1−V)*(1, 0, 0), and the sum is determined as the color value of the target pixel.

In step S2303, a color-gradient-effect image corresponding to the target object is drawn based on the color values of the target pixels.

Figure 24:
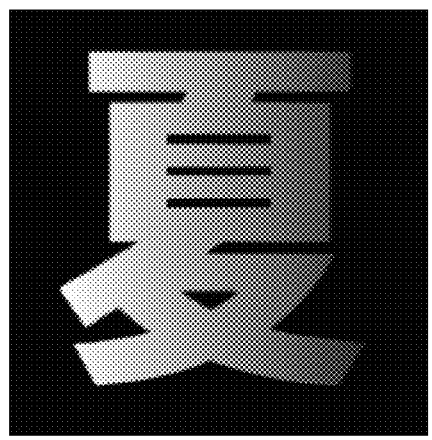
FIG. 24 is a schematic diagram of a color-gradient-effect image according to an embodiment of the present disclosure.

In the embodiments of the present disclosure, the color-gradient-effect image corresponding to the target object is drawn based on the color values of the target pixels after the color values of the target pixels are determined. Reference is made to FIG. 24, which is a schematic diagram of a color-gradient-effect image according to an embodiment of the present disclosure.

It is should be noted that a in which color values of pixels other than the target pixels in the signed distance field image of the target object are determined is not limited in the embodiments of the present disclosure, and the color values of the pixels other than the target pixels may be set as a default color value and the like.

In the method for processing a color-gradient effect according to an embodiment of the present disclosure. First, gradient values corresponding to target pixels are determined based on position information of the target pixels and a gradient-direction vector. Then color values of the target pixels are determined based on the gradient values corresponding to the target pixels, target gradient colors, and a target gradient position. Finally, a color-gradient-effect image corresponding to the target object is drawn based on the color values of the target pixels.

In the embodiments of the present disclosure, the color values are determined based on the position information of the target pixels, so as to draw the color-gradient-effect image of the target object. It can be seen that in the embodiments of the present disclosure, the color-gradient effect of the target object can be realized, thereby meeting user's requirements for effect processing.

In addition, a method for processing a fast-color-gradient effect is further provided according to an embodiment of the present disclosure. Specifically, the gradient values are within a range from a preset third boundary value to a preset fourth boundary value. The target gradient colors include a third target color and a fourth target color. A gradient value corresponding to the third target color is the preset fourth boundary value, for example, 1, and a gradient value corresponding to the fourth target color is the preset third boundary value, for example, 0.

In practice, in the method for processing a fast-color-gradient effect, a target gradient position is first received. The target gradient position is within a range from the preset third boundary value to the preset fourth boundary value. Then, it is determined, for each of the target pixels, whether a gradient value corresponding to the target pixel is within a range from the preset third boundary value to the target gradient position or whether the gradient value corresponding to the target pixel is within a range from the target gradient position to the preset fourth boundary value. The fourth target color is determined as the color value of the target pixel in a case of determining that the gradient value corresponding to the target pixel is within the range from the preset third boundary value to the target gradient position or determining that the gradient value corresponding to the target pixel is not within the range from the target gradient position to the preset fourth boundary value, and otherwise, the third target color is determined as the color value of the target pixel.

In an embodiment, the preset third boundary value is equal to 0, the preset fourth boundary value is equal to 1, and the gradient value is within the range from 0 to 1. Specifically, the target gradient position is received first before determining color values of the target pixels. The target gradient position may be within a range from 0 to 1. Then, for each of the target pixels, it is determined whether a gradient value corresponding to the target pixel is within the range from 0 to the target gradient position. The color value corresponding to the target pixel is determined as the fourth target color corresponding to the gradient value 0In a case of determining that the gradient value corresponding to the target pixel is within the range from 0 to the target gradient position, and otherwise, the color value corresponding to the target pixel is determined as the third target color corresponding to the gradient value 1.

In addition, it may be determined, for each of the target pixels, whether a gradient value corresponding to the target pixel is within the range from the target gradient position to 1. The color value corresponding to the target pixel is determined as the third target color corresponding to the gradient value 1 in a case of determining that the gradient value corresponding to the target pixel is within the range from the target gradient position to 1, and otherwise, the color value corresponding to the target pixel is determined as the fourth target color corresponding to the gradient value 0.

Figure 25:
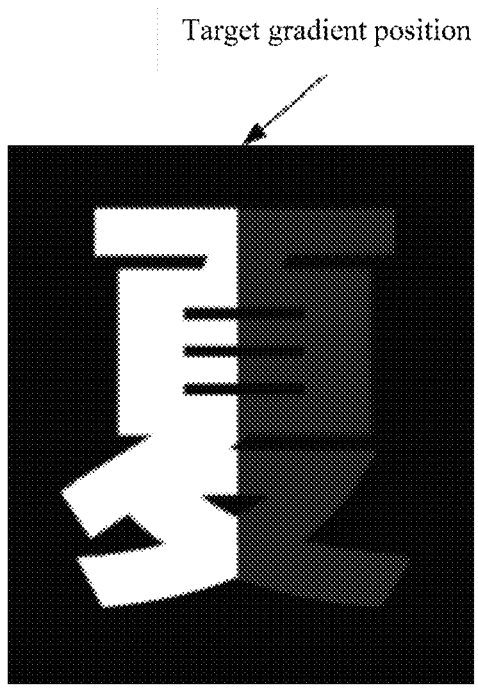
FIG. 25 is a schematic diagram showing a fast-gradient effect according to an embodiment of the present disclosure.

The target gradient position refers to the position where the fast gradient from the third target color to the fourth target color occurs. Reference is made to FIG. 25, which is a schematic diagram showing a fast-gradient effect according to an embodiment of the present disclosure. The fast gradient from white to gray occurs at the target gradient position shown in FIG. 25.

Based on the above embodiments, an object processed with the method for processing a color-gradient effect according to the embodiments of the present disclosure may be target text. Specifically, a color-gradient-effect image is drawn for the target text.

In an embodiment, an exterior region of the text may be set to have a color-gradient effect. Distance field values of pixels located in the exterior region of the text are greater than 0, therefore pixels in the signed distance field image of the target text which have distance field values greater than 0 and less than a preset distance field value may be determined as target pixels of the target text. Gradient values corresponding to the target pixels are determined, so as to realize a color-gradient effect of the target text.

In addition, a luminous effect of the target text may be realized based on the color-gradient effect of the target text.

Figure 26:
FIG. 26 is a schematic diagram of a gradient-luminous-effect image for target text according to an embodiment of the present disclosure.

Specifically, for each of the target pixels, a distance field value of the target pixel is set to be inversely proportional to a color transparency value of the target pixel, and then the color transparency value of the target pixel is determined based on the distance field value of the target pixel. Finally, a color value of the target pixel is determined based on the color transparency value of the target pixel. A gradient-luminous-effect image corresponding to the target text is drawn based on color values of all target pixels. Reference is made to FIG. 26, which is a schematic diagram of a gradient-luminous-effect image for target text according to an embodiment of the present disclosure. The target text shown in FIG. 26 has a gradient effect and a luminous effect.

In the embodiments of the present disclosure, the color values and the color transparency values of the target pixels are determined based on the distance field values of the pixels in the signed distance field image of the target text, so as to draw a gradient-luminous-effect image for target text, thereby meeting user's requirements for text effect processing.

An apparatus for generating a signed distance field image is provided according to the present disclosure based on the above method embodiments. The apparatus includes a first determination module, a triangle-drawing module, a counting module, a second determination module, and a first generation module.

The first determination module is configured to determine a target closed curve in an unsigned distance field image of target text, and an origin corresponding to the target closed curve.

The triangle-drawing module is configured to draw a target triangle by taking two adjacent sample points on the target closed curve and the origin as vertices according to a sampling order of the adjacent sample points. The sampling order is a preset direction along the target closed curve.

The counting module is configured to perform counting for pixels within the target triangle based on a drawing direction of the target triangle. The drawing direction of the target triangle is a clockwise direction or a counterclockwise direction. A counting manner in a case where the drawing direction is the clockwise direction is inverse to a counting manner in a case where the drawing direction is the counterclockwise direction. The counting manners include increment by N or decrement by N, and N is a nonzero number.

The second determination module is configured to determine that pixels having counting results equal to 0 in the unsigned distance field image are located in an interior region of the target text, and determine that pixels having counting results not equal to 0 in the unsigned distance field image are located in the exterior region of the target text.

The first generation module is configured to generate a signed distance field image of the target text based on pixels located in the exterior region of the target text, pixels located in the interior region of the target text, and the unsigned distance field image.

In an embodiment, that a counting manner in a case where the drawing direction is the clockwise direction is inverse to a counting manner in a case where the drawing direction is the counterclockwise direction refers to that: the counting manner for pixels within the target triangle is increment by N per count in a case that the drawing direction is a clockwise direction, and the counting manner for pixels within the target triangle is decrement by N per count in a case that the drawing direction is a counterclockwise direction; or the counting manner for pixels within the target triangle is decrement by N per count in a case that the drawing direction is a clockwise direction, and the counting manner for pixels within the target triangle is increment by N per count in a case that the drawing direction is a counterclockwise direction.

In an embodiment, the apparatus further includes a split module and a storage module.

The splitting module is configured to split, for each pixel in the signed distance field image, a distance field value of the pixel into four 8-bit unsigned integers.

The storage module is configured to store the four 8-bit unsigned integers by using four color channels of RGBA respectively.

In an embodiment, the split module is configured to multiply four parts including integer part, [1/256, 1], [$1/256^2$, 1/256], and [$1/256^3$, $1/256^2$] of the distance field value of each pixel in the signed distance field image by 1, 256, $256^2$, and $256^3$ respectively, to obtain four 8-bit unsigned integers.

In an embodiment, the apparatus further includes a recovery module. The recovery module is configured to, in response to an application-triggering operation on the signed distance field image, combine values obtained by dividing the four 8-bit unsigned integers representing the distance field value by 1, 256, $256^2$, and $256^3$ respectively to obtain a 32-bit floating-point number as the distance field value of the pixel.

In an embodiment, the apparatus further includes a conversion module and a second generation module.

The conversion module is configured to convert a third-order Bezier curve in a target typeface file into a second-order Bezier curve to obtain a converted target typeface file.

The second generation module is configured to generate an unsigned distance field image of the target text collectively based on the converted target typeface file and vector contour information of the target text.

In an embodiment, the apparatus further includes a buffer module. The buffer module is configured to buffer the signed distance field image of the target text.

In an embodiment, the signed distance field image of the target text is generated in real time.

In the apparatus for generating a signed distance field image according to an embodiment of the present disclosure, a counting manner for pixels and a manner for determining whether a pixel is located in the interior region of the text based on a counting result of the pixel are improved in the shape-drawing phase, which improves the accuracy of determining whether a pixel within the overlapping region of the closed curves in the text is located in the interior region of the target text, thereby improving the accuracy of generating the signed distance field image.

In addition to the methods and the apparatus described above, a computer-readable storage medium is further provided according to an embodiment of the present disclosure. The computer-readable storage medium stores instructions. The instructions, when executed by a terminal device, cause the terminal device to perform the method for generating a signed distance field image, or various methods for generating a text effect image according to the embodiments of the present disclosure such as the method for generating a contour-effect image for text, the method for generating a luminous-effect image for text, a method for generating a shadow-effect image for text, and the method for generating a color-gradient-effect image for text.

A computer program product is further provided according to an embodiment of the present disclosure. The computer program product includes a computer program or instructions. The computer program or instructions, when executed by a processor, performs the method for generating a signed distance field image, or various methods for generating a text effect image according to the embodiments of the present disclosure such as the method for generating a contour-effect image for text, the method for generating a luminous-effect image for text, a method for generating a shadow-effect image for text, and the method for generating a color-gradient-effect image for text.

Figure 27:
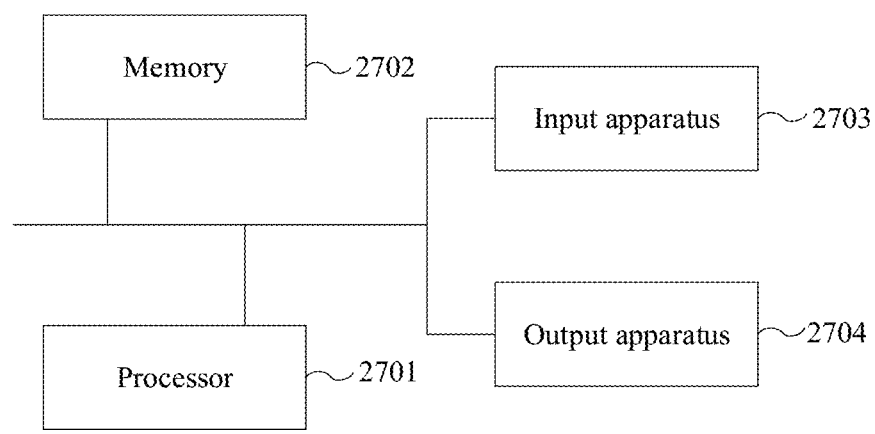
FIG. 27 is a schematic structural diagram of an electronic device according to an embodiment of the present disclosure.

In addition, an electric device is further provided according to an embodiment of the present disclosure. As shown in FIG. 27, the device includes a processor 2701, a memory 2702, an input apparatus 2703 and an output apparatus 2704. The number of the processor 2701 in the apparatus for generating a signed distance field image may be one or more. For example, as shown in FIG. 27, the number of the processor is one. In some embodiments of the present disclosure, the processor 2701, the memory 2702, the input apparatus 2703 and the output apparatus 2704 may be connected to each other through a bus or other ways, and the connection through a bus is taken as an example in FIG. 27.

The memory 2702 may be configured to store a software program and a module. The processor 2701 runs the software program and the module stored in the memory 2702, to perform various functional applications and data processing of the apparatus for generating a signed distance field image. The memory 2702 may mainly include a program memory area and a data memory area. The program memory area may store an operating system, an application required by at least one function and the like. In addition, the memory 2702 may include a high-speed random access memory, and may further include a non-volatile memory, such as at least one disk storage device, a flash device or other volatile solid-state storage device. The input apparatus 2703 may be configured to receive inputted number or character information, and input a signal related to user settings and function control of the apparatus for generating a signed distance field image.

In the embodiments, the processor 2701 may load an executable file corresponding to the processes of one or more application programs into the memory 2702, and the processor 2701 runs the application program stored in the memory 2702, thereby achieving various functions in the electronic device described above.

According to an embodiment, the processor executes the executable instructions stored in the memory 2702, so as to cause the electronic device to determine a target closed curve in an unsigned distance field image of target text, and an origin corresponding to the target closed curve; draw a target triangle by taking two adjacent sample points on the target closed curve and the origin as vertices according to a sampling order of the adjacent sample points, where the sampling order is a preset direction along the target closed curve; perform counting for pixels within the target triangle based on a drawing direction of the target triangle, where the drawing direction of the target triangle is a clockwise direction or a counterclockwise direction, a counting manner in a case where the drawing direction is the clockwise direction is inverse to a counting manner in a case where the drawing direction is the counterclockwise direction, the counting manners include increment by N or decrement by N, and N is a nonzero number; determine that pixels having counting results equal to 0 in the unsigned distance field image are located in an interior region of the target text, and determine that pixels having counting results not equal to 0 in the unsigned distance field image are located in the exterior region of the target text; and generate a signed distance field image of the target text based on pixels located in the exterior region of the target text, pixels located in the interior region of the target text, and the unsigned distance field image.

According to an embodiment, that a counting manner in a case where the drawing direction is the clockwise direction is inverse to a counting manner in a case where the drawing direction is the counterclockwise direction refers to that: the counting manner for pixels within the target triangle is increment by N per count in a case that the drawing direction is a clockwise direction, and the counting manner for pixels within the target triangle is decrement by N per count in a case that the drawing direction is a counterclockwise direction; or the counting manner for pixels within the target triangle is decrement by N per count in a case that the drawing direction is a clockwise direction, and the counting manner for pixels within the target triangle is increment by N per count in a case that the drawing direction is a counterclockwise direction.

According to an embodiment, the processor executes the executable instructions stored in the memory 2702, so as to cause the electronic device to split, for each pixel in the signed distance field image, a distance field value of the pixel into four 8-bit unsigned integers; and store the four 8-bit unsigned integers by using four color channels of RGBA.

According to an embodiment, the processor executes the executable instructions stored in the memory 2702, so as to cause the electronic device to multiply four parts including integer part, $[1/256, 1]$, $[1/256^2, 1/256]$, and $[1/256^3, 1/256^2]$ of the distance field value of each pixel in the signed distance field image by 1, 256, $256^2$, and $256^3$ respectively, to obtain four 8-bit unsigned integers.

According to an embodiment, the processor executes the executable instructions stored in the memory 2702, so as to cause the electronic device to, in response to an application-triggering operation on the signed distance field image, combine values obtained by dividing the four 8-bit unsigned integers by 1, 256, $256^2$, and $256^3$ respectively to obtain a 32-bit floating-point number as the distance field value of the pixel.

According to an embodiment, the processor executes the executable instructions stored in the memory 2702, so as to cause the electronic device to convert a third-order Bezier curve in a target typeface file into a second-order Bezier curve to obtain a converted target typeface file; and generate an unsigned distance field image of the target text collectively based on the converted target typeface file and vector contour information of the target text.

According to an embodiment, the processor executes the executable instructions stored in the memory 2702, so as to cause the electronic device to buffer the signed distance field image of the target text.

According to an embodiment, the signed distance field image of the target text is generated in real time.

According to an embodiment, the processor executes the executable instructions stored in the memory 2702, so as to cause the electronic device to generate a signed distance field image of the target text with the method for generating a signed distance field image described above; and generate an effect image corresponding to the target text based on an effect-resource file and the signed distance field image of the target text.

According to an embodiment, the processor executes the executable instructions stored in the memory 2702, so as to cause the electronic device to determine, in response to a selection operation for the effect-resource file, effect parameters for drawing layers for the target text based on the effect-resource file; and draw the text effect image corresponding to the target text layer by layer based on the distance field image of the target text and the effect parameters for the drawing layers.

According to an embodiment, the processor executes the executable instructions stored in the memory 2702, so as to cause the electronic device to perform the method for processing a contour effect of text. The method includes: in response to detecting in the signed distance field image of the target text, a pixel having the same position coordinates as a pixel in an image already drawn on a canvas, comparing a distance field value of the pixel in the signed distance field image with a distance field value of the pixel in the image already drawn on the canvas; in response to determining, among the pixels having the same position coordinates, that the distance field value of the pixel in the signed distance field image is less than a first value, drawing the pixel in the signed distance field image onto the canvas; and generating a contour-effect image corresponding to the target text based on pixels in the signed distance field image which are drawn onto the canvas.

According to an embodiment, the processor executes the executable instructions stored in the memory 2702, so as to cause the electronic device to determine, based on correspondence between color values and distance-field-value ranges, color values corresponding to distance field values of the pixels in the signed field image as color values of the pixels before drawing the pixels, in the signed field image, on the canvas; and draw, based on the color values of the pixels, the pixels, in the signed field image, on the canvas.

According to an embodiment, the processor executes the executable instructions stored in the memory 2702, so as to cause the electronic device, before generating the contour-effect image corresponding to the target text based on the pixels in the signed distance field image which are drawn onto the canvas, to determine, for each of pixels having distance field values greater than 0 in the signed distance field image, a gradient value of the pixel based on a dot product of offset coordinates of the pixel and a gradient-direction vector, where the offset coordinate refers to a difference between position coordinates of the pixel and coordinates of a gradient origin, and determine, for each of pixels having distance field values greater than 0 in the signed distance field image, a color value of the pixel based on a gradient value of the pixel and target gradient colors.

According to an embodiment, the processor executes the executable instructions stored in the memory 2702, so as to cause the electronic device, before generating the contour-effect image corresponding to the target text based on the pixels in the signed distance field image which are drawn onto the canvas, to determine, color transparency values of pixels having distance field values less than 0 based on distance field values of the pixels. For each of the pixels, an absolute value of a distance field value of the pixels is inversely proportional to a color transparency value of the pixel.

According to an embodiment, the processor executes the executable instructions stored in the memory 2702, so as to cause the electronic device to make, in response to determining that the distance field value of the pixel, in the signed distance field image of the target text, among the pixels having the same position coordinates is greater than a second value, a mark for the pixel in the signed distance field image. The mark is used for indicating that the pixel is not to be drawn on the canvas.

According to an embodiment, the processor executes the executable instructions stored in the memory 2702, so as to cause the electronic device to perform the method for processing a luminous effect of text. The method includes: determining, in the signed distance field image of the target text, pixels having distance field values within a preset range as target pixels corresponding to the target text; determining color transparency values corresponding to the target pixels based on the distance field values of the target pixels, where for each of the target pixels, an absolute value of a distance field value of the target pixel is inversely proportional to a color transparency value of the target pixel; and drawing a luminous-effect image corresponding to the target text based on the color transparency values corresponding to the target pixels.

According to an embodiment, the preset range is determined to be a range greater than 0 and less than a first preset value. The luminous-effect image is an exterior-luminous-effect image for the target text. The first preset value indicates a luminous radius of the target text with an exterior-luminous effect.

According to an embodiment, the preset range is determined to be a range greater than a second preset value and less than 0. The luminous-effect image is an interior-luminous-effect image for the target text. The second preset value indicates a luminous radius of the target text with an interior-luminous effect.

According to an embodiment, the preset range is determined to be a range greater than a third preset value and less than a fourth preset value. The third preset value is less than 0, and the fourth preset value is greater than 0. The luminous-effect image is an interior-exterior-luminous-effect image for target text. The third preset value indicates an interior-luminous radius of the target text with the interior-luminous effect and the exterior-luminous effect. The fourth preset value indicates an exterior-luminous radius of the target text with the interior-luminous effect and the exterior-luminous effect.

According to an embodiment, the processor executes the executable instructions stored in the memory 2702, so as to cause the electronic device to draw target pixels on a canvas on which an image is drawn based on color transparency values corresponding to the target pixels; and generate a luminous-effect image corresponding to the target text based on the drawing of the target pixels on the canvas.

According to an embodiment, the processor executes the executable instructions stored in the memory 2702, so as to cause the electronic device to perform Post-processing of Gaussian blur on the signed distance field image of the target text before determining, in the signed distance field image of the target text, pixels having distance field values within the preset range as the target pixels corresponding to the target text.

According to an embodiment, the processor executes the executable instructions stored in the memory 2702, so as to cause the electronic device to determine, for each of the target pixels, a dot product of position coordinates of the target pixel and a gradient-direction vector as a gradient value corresponding to the target pixel before drawing the luminous-effect image corresponding to the target text based on the color transparency values corresponding to the target pixels, where the gradient-direction vector represents a direction of color gradient; and determine, for each of the target pixels, a color value of the target pixel based on a gradient value of the target pixel, target gradient colors, and a target gradient position; and draw the luminous-effect image corresponding to the target text based on the color values and the color transparency values of the target pixels.

According to an embodiment, the processor executes the executable instructions stored in the memory 2702, so as to cause the electronic device to, in a case of the distance field value of the target pixel greater than 0, determine a ratio of the distance field value of the target pixel to a preset first luminous radius and determine a difference obtained by subtracting the ratio from 1 as a color transparency value corresponding to the target pixel; and in a case of the distance field value of the target pixel less than 0, determine a ratio of the distance field value of the target pixel to a preset second luminous radius and determine a sum of 1 and the ratio as a color transparency value corresponding to the target pixel.

According to an embodiment, the processor executes the executable instructions stored in the memory 2702, so as to cause the electronic device to perform an effect processing method. Specifically, the electronic device performs steps of: obtaining a distance field image of a to-be-processed object, and a first effect distance field image; calculating a sum of a distance field value of a pixel in the distance field image of the to-be-processed object and a distance field value of a pixel in the first effect distance field image located at same position coordinates as the pixel in the distance field image, and determining the sum as a distance field value of a pixel having the same position coordinates in a first target distance field image; and drawing a first target effect image for the to-be-processed object based on distance field values of pixels in the first target distance field image.

According to an embodiment, the processor executes the executable instructions stored in the memory 2702, so as to cause the electronic device to obtain a second effect distance field image, where the first effect distance field image and the second effect distance field image are selected from a distance-field-image sequence, and have different time stamps; calculate a sum of a distance field value of a pixel in the distance field image of the to-be-processed object and a distance field value of a pixel in the second effect distance field image where the pixel in the distance field image of the to-be-processed object has the same position coordinates as the pixel in the second effect distance field image, and determine the sum as a distance field value of a pixel having the same position coordinates in a second target distance field image; draw a second target effect image for the to-be-processed object based on distance field values of pixels in the second target distance field image; and generate a sequential effect animation for the to-be-processed object based on the first target effect image and the second target effect image according to a chronological order of the time stamps.

According to an embodiment, the distance-field-image sequence includes multiple continuous distance-field-image frames generated based on a preset transformation rule. The preset transformation rule includes sine transformation, cosine transformation, or a pulse curve. The multiple continuous distance-field-image frames include the first effect distance field image and the second effect distance field image. Alternatively, the distance-field-image sequence includes multiple continuous distance-field-image frames for noise effects.

According to an embodiment, the to-be-processed object includes target text.

According to an embodiment, the processor executes the executable instructions stored in the memory 2702, so as to cause the electronic device to determine pixels, having distance field values less than 0, in the first target distance field image as first target pixels; determine, for each of the first target pixels, a gradient value of the first target pixel based on a dot product of offset coordinates of the first target pixel and a gradient-direction vector, where the offset coordinates represent a difference between position coordinates of the first target pixel and coordinates of a gradient origin; determine color values of the first target pixels based on the gradient values of the first target pixels and target gradient colors; and draw the first target effect image of the to-be-processed object based on the color values of the first target pixels.

According to an embodiment, the processor executes the executable instructions stored in the memory 2702, so as to cause the electronic device to determine pixels, having distance field values less than 0, in the first target distance field image as second target pixels; determine color transparency values of the second target pixels based on the distance field values of the second target pixels, where for each of the second target pixels, an absolute value of a distance field value of the second target pixel is inversely proportional to a color transparency value of the second target pixel; and draw the first target effect image for the to-be-processed object based on the color transparency values of the second target pixels.

According to an embodiment, the processor executes the executable instructions stored in the memory 2702, so as to cause the electronic device to perform the method for processing a shadow effect of text. Specifically, the electronic device performs steps of: performing position offset on pixels in the signed distance field image of the target text to obtain a first distance field image, where the first distance field image includes original pixels and offset pixels obtained after the original pixels are subjected to position offset; drawing an initial interior-shadow-effect image corresponding to the target text based on the first distance field image; determining a target region composed of offset pixels, in the first distance field image, having distance field values greater than a preset value; and removing the target region from the initial interior-shadow-effect image to obtain an interior-shadow-effect image for the target text.

According to an embodiment, the processor executes the executable instructions stored in the memory 2702, so as to cause the electronic device to draw a text body of the target text based on the original pixels in the first distance filed image; draw an interior shadow of target text based on the offset pixels in the first distance filed image to obtain the initial interior-shadow-effect image corresponding to the target text.

According to an embodiment, the processor executes the executable instructions stored in the memory 2702, so as to cause the electronic device to determine, for each of offset pixels in the first distance field image, a gradient value of the offset pixel based on a dot product of offset coordinates of the offset pixel and a gradient-direction vector, where the offset coordinates represent a difference between position coordinates of the offset pixel and coordinates of a gradient origin; determine, for each of offset pixels, a color value of the offset pixel collectively based on a gradient value of the offset pixel and target gradient colors; and draw the interior shadow of the target text based on color values of the offset pixels.

According to an embodiment, the processor executes the executable instructions stored in the memory 2702, so as to cause the electronic device to draw an exterior-shadow-effect image corresponding to the target text based on the first distance field image.

According to an embodiment, the processor executes the executable instructions stored in the memory 2702, so as to cause the electronic device to draw an exterior shadow of the target text based on the offset pixels in the first distance field image; and draw the text body of the target text based on the original pixels in the first distance field image to obtain an exterior-shadow-effect image corresponding to the target text.

According to an embodiment, the processor executes the executable instructions stored in the memory 2702, so as to cause the electronic device to determine color transparency values of the original pixels in the first distance field image, where for each of the original pixels, a distance field value of the original pixel is inversely proportional to a color transparency value of the original pixel; and draw the text body of the target text based on the color transparency values of the original pixels.

According to an embodiment, the processor executes the executable instructions stored in the memory 2702, so as to cause the electronic device to determine, for each of offset pixels in the first distance field image, a gradient value of the offset pixel based on a dot product of offset coordinates of the offset pixel and a gradient-direction vector, where the offset coordinates represent a difference between position coordinates of the offset pixel and coordinates of a gradient origin; determine, for each of offset pixels in the first distance field image, a color value of the offset pixel based on a gradient value of the pixel and target gradient colors; and draw an exterior shadow of the target text based on color values of the offset pixels.

According to an embodiment, the processor executes the executable instructions stored in the memory 2702, so as to cause the electronic device to mix a color of an original pixel in the first distance field image and a color of an offset pixel in the first distance field image based on color transparency values, where the original pixel in the first distance field image has the same position information as the offset pixel in the first distance field image.

According to an embodiment, the processor executes the executable instructions stored in the memory 2702, so as to cause the electronic device to perform the method for processing a color-gradient effect. Specifically, the electronic device performs steps of: determining gradient values corresponding to target pixels based on position information of the target pixels and a gradient-direction vector, where the gradient-direction vector represents a direction of color gradient; determining color values of the target pixels based on the gradient values corresponding to the target pixels and target gradient colors; and drawing a color-gradient-effect image corresponding to the target object based on the color values of the target pixels.

According to an embodiment, the processor executes the executable instructions stored in the memory 2702, so as to cause the electronic device to determine, in response to an angle-selection operation for a rotatable slider, the gradient-direction vector before determining gradient values corresponding to the target pixels based on position information of the target pixels and a gradient-direction vector. There is correspondence between gradient-direction vectors and selected angles for the rotatable slider.

According to an embodiment, the gradient values are within a range from a preset first boundary value to a preset second boundary value. The target gradient colors include a first target color and a second target color. A gradient value corresponding to the first target color is the preset second boundary value, and a gradient value corresponding to the second target color is the preset first boundary value. The electronic device determines the color values of the target pixels based on the gradient values corresponding to the target pixels, the target gradient colors, the preset first boundary value and the preset second boundary value.

According to an embodiment, the preset first boundary value is equal to 0, and the preset second boundary value is equal to 1. The electronic device, for each of the target pixels, performs steps of: calculating a product of a gradient value corresponding to the target pixel and a color value of the first target color as a first value; and calculating, a difference between 1 and the gradient value corresponding to the target pixel and determining a product of the difference and a color value corresponding to the second target color as a second value; and determining a sum of the first value and the second value as a color value of the target pixel.

According to an embodiment, the target object includes target text, and the electronic device, before determining the gradient values corresponding to the target pixels based on the position information of the target pixels and the gradient-direction vector, performs steps of: determining, in the signed distance field image of the target text, pixels having distance field values with a preset range as the target pixels corresponding to the target text. The preset range is a range greater than 0 and less than a preset distance field value.

According to an embodiment, the processor executes the executable instructions stored in the memory 2702, so as to cause the electronic device to determine, based on the distance field values of the target pixels, color transparency values of the target pixels before determining the color values of the target pixels based on the gradient values corresponding to the target pixels and the target gradient colors, where for each of the target pixels, a distance field value of the target pixel is inversely proportional to a color transparency value of the target pixel; and determine color values of the target pixels based on the gradient values corresponding to the target pixels, the color transparency values, and the target gradient colors.

According to an embodiment, the gradient values are within a range from a preset third boundary value to a preset fourth boundary value. The target gradient colors include a third target color and a fourth target color. A gradient value corresponding to the third target color is the preset fourth boundary value, and a gradient value corresponding to the fourth target color is the preset third boundary value. The processor executes the executable instructions stored in the memory 2702, so as to cause the electronic device to receive a target gradient position before determining the color values of the target pixels based on the gradient values corresponding to the target pixels and the target gradient colors, where the target gradient position is within a range from the preset third boundary value to the preset fourth boundary value; determine, for each of the target pixels, whether a gradient value corresponding to the target pixel is within a range from the preset third boundary value to the target gradient position or whether the gradient value corresponding to the target pixel is within a range from the target gradient position to the preset fourth boundary value; determine, for each of the target pixels, the fourth target color as the color value of the target pixel in a case of determining that the gradient value corresponding to the target pixel is within the range from the preset third boundary value to the target gradient position or in a case of determining that the gradient value corresponding to the target pixel is not within the range from the target gradient position to the preset fourth boundary value; and otherwise, determine the third target color as the color value of the target pixel.

It should be noted that the terms "first", "second" and the like in the description are used for distinguishing an entity or operation from another entity or operation, rather than requiring or implying an actual relationship or order between these entities or operations. In addition, terms of "include", "comprise" or any other variants are intended to be non-exclusive. Therefore, a process, method, article or device including a series of elements includes not only the elements but also other elements that are not enumerated, or also include the elements inherent for the process, method, article or device. Unless expressively limited otherwise, an element defined by a statement of "comprising (including) one . . . " does not exclude a case that other similar elements exist in the process, method, article or device including the element.

The above are only specific implementations of the present disclosure, so that those skilled in the art can understand or implement the present disclosure. It is apparent for those skilled in the art to make many modifications to these embodiments. The general principle defined herein may be applied to other embodiments without departing from the scope of the present disclosure. Therefore, the present disclosure is not limited to the embodiments illustrated herein, but should be defined by the broadest scope consistent with the principle and novel features disclosed herein.

The invention claimed is:

1. A method for generating a signed distance field image, comprising:
   determining a target closed curve in an unsigned distance field image of target text, and determining an origin corresponding to the target closed curve;
   drawing a target triangle by taking two adjacent sample points on the target closed curve and the origin as vertices according to a sampling order of the adjacent sample points, wherein the sampling order is a preset direction along the target closed curve;
   performing counting for pixels within the target triangle based on a drawing direction of the target triangle, wherein
      the drawing direction of the target triangle is a clockwise direction or a counterclockwise direction;
      a counting manner in a case where the drawing direction is the clockwise direction is inverse to a counting manner in a case where the drawing direction is the counterclockwise direction; and
      the counting manners comprise increment by N per count or decrement by N per count, and N is a nonzero number;
   determining that pixels having counting results equal to 0 in the unsigned distance field image are located in an interior region of the target text, and determining that pixels having counting results not equal to 0 in the unsigned distance field image are located in the exterior region of the target text; and
   generating a signed distance field image of the target text based on the pixels located in the exterior region of the target text, the pixels located in the interior region of the target text, and the unsigned distance field image.

2. The method according to claim 1, wherein that the counting manner in the case where the drawing direction is the clockwise direction is inverse to the counting manner in the case where the drawing direction is the counterclockwise direction comprises that:
   the counting manner for pixels within the target triangle is increment by N per count in the case that the drawing direction is the clockwise direction, and the counting manner for pixels within the target triangle is decrement by N per count in the case that the drawing direction is the counterclockwise direction; or
   the counting manner for pixels within the target triangle is decrement by N per count in the case that the drawing direction is the clockwise direction, and the counting manner for pixels within the target triangle is increment by N per count in the case that the drawing direction is the counterclockwise direction.

3. The method according to claim 1, further comprising:
   for each of pixels in the signed distance field image,
   splitting a distance field value corresponding to the pixel into four 8-bit unsigned integers; and
   storing the four 8-bit unsigned integers by using four color channels of RGBA respectively.

4. The method according to claim 1, further comprising:
   buffering the signed distance field image of the target text.

5. The method according to claim 1, wherein the signed distance field image of the target text is generated in real time.

6. The method according to claim 1, wherein before determining the target closed curve in the unsigned distance field image of target text, the method further comprises:
   converting a third-order Bezier curve in a target typeface file into a second-order Bezier curve to obtain a converted target typeface file; and
   generating the unsigned distance field image of the target text collectively based on the converted target typeface file and vector contour information of the target text.

7. The method according to claim 1, further comprising:
   obtaining a first effect distance field image;
   calculating a sum of a distance field value of a pixel in the signed distance field image of the target text and a distance field value of a pixel in the first effect distance field image located at same position coordinates as the pixel in the signed distance field image, and determining the sum as a distance field value of a pixel located at the same position coordinates in a first target distance field image; and
   drawing a first target effect image for the target text based on distance field values of pixels in the first target distance field image.

8. The method according to claim 7, further comprising:
   obtaining a second effect distance field image, wherein the first effect distance field image and the second effect distance field image belong to a distance-field-image sequence and have different time stamps;
   calculating a sum of a distance field value of a pixel in the signed distance field image of the target text and a distance field value of a pixel in the second effect distance field image located at same position coordinates as the pixel in the signed distance field image of the target text, and determining the sum as a distance field value of a pixel located at the same position coordinates in a second target distance field image;
   drawing a second target effect image for the target text based on distance field values of pixels in the second target distance field image; and
   generating a sequential effect animation for the target text based on the first target effect image and the second target effect image according to a chronological order of the time stamps.

9. The method according to claim 1, further comprising:
   in response to detecting, in the signed distance field image of the target text, a pixel having same position coordinates as a pixel in an image already drawn on a canvas, comparing a distance field value of the pixel in the signed distance field image with a distance field value of the pixel in the image already drawn on the canvas;

in response to determining, among the pixels having the same position coordinates, that the distance field value of the pixel in the signed distance field image is less than a first value, drawing the pixel in the signed distance field image onto the canvas; and generating a contour-effect image corresponding to the target text based on pixels in the signed distance field image which are drawn onto the canvas.

10. The method according to claim 1, further comprising:

determining, in the signed distance field image of the target text, pixels having distance field values within a preset range as target pixels corresponding to the target text;

determining color transparency values corresponding to the target pixels based on the distance field values of the target pixels, wherein for each of the target pixels, an absolute value of a distance field value of the target pixel is inversely proportional to a color transparency value of the target pixel; and drawing a luminous-effect image corresponding to the target text based on the color transparency values corresponding to the target pixels.

11. The method according to claim 1, further comprising:

performing position offset on pixels in the signed distance field image of the target text to obtain a first distance field image, wherein the first distance field image comprises original pixels and offset pixels obtained after the original pixels are subjected to position offset;

drawing an initial interior-shadow-effect image corresponding to the target text based on the first distance field image;

determining a target region composed of offset pixels, in the first distance field image, having distance field values greater than a preset value; and removing the target region from the initial interior-shadow-effect image to obtain an interior-shadow-effect image for the target text.

12. The method according to claim 1, further comprising:

determining, based on position information of pixels in the signed distance field image of the target text and a gradient-direction vector, gradient values corresponding to the pixels, wherein the gradient-direction vector represents a direction of color gradient;

determining color values of the pixels based on the gradient values corresponding to the pixels and target gradient colors; and drawing a color-gradient-effect image corresponding to the target text based on the color values of the pixels.

13. An electronic device, comprising:

a processor; and a memory storing executable instructions, wherein the processor, when executing the executable instructions, is configured to:

determine a target closed curve in an unsigned distance field image of target text, and determine an origin corresponding to the target closed curve;

draw a target triangle by taking two adjacent sample points on the target closed curve and the origin as vertices according to a sampling order of the adjacent sample points, wherein the sampling order is a preset direction along the target closed curve;

perform counting for pixels within the target triangle based on a drawing direction of the target triangle, wherein the drawing direction of the target triangle is a clockwise direction or a counterclockwise direction;

a counting manner in a case where the drawing direction is the clockwise direction is inverse to a counting manner in a case where the drawing direction is the counterclockwise direction; and the counting manners comprise increment by N per count or decrement by N per count, and N is a nonzero number;

determine that pixels having counting results equal to 0 in the unsigned distance field image are located in an interior region of the target text, and determine that pixels having counting results not equal to 0 in the unsigned distance field image are located in the exterior region of the target text; and generate a signed distance field image of the target text based on the pixels located in the exterior region of the target text, the pixels located in the interior region of the target text, and the unsigned distance field image.

14. The electronic device according to claim 13, wherein the processor, when executing the executable instructions, is further configured to:

obtain a first effect distance field image;

calculate a sum of a distance field value of a pixel in the signed distance field image of the target text and a distance field value of a pixel in the first effect distance field image located at same position coordinates as the pixel in the signed distance field image, and determine the sum as a distance field value of a pixel located at the same position coordinates in a first target distance field image; and draw a first target effect image for the target text based on distance field values of pixels in the first target distance field image.

15. The electronic device according to claim 13, wherein the processor, when executing the executable instructions, is further configured to:

in response to detecting in the signed distance field image of the target text, a pixel having the same position coordinates as a pixel in an image already drawn on a canvas, compare a distance field value of the pixel in the signed distance field image with a distance field value of the pixel in the image already drawn on the canvas;

in response to determining, among the pixels having the same position coordinates, that the distance field value of the pixel in the signed distance field image is less than a first value, draw the pixel in the signed distance field image onto the canvas; and generate a contour-effect image corresponding to the target text based on pixels in the signed distance field image which are drawn onto the canvas.

16. The electronic device according to claim 13, wherein the processor, when executing the executable instructions, is further configured to:

determine, in the signed distance field image of the target text, pixels having distance field values within a preset range as target pixels corresponding to the target text;

determine color transparency values corresponding to the target pixels based on the distance field values of the target pixels, wherein for each of the target pixels, an absolute value of a distance field value of the target pixel is inversely proportional to a color transparency value of the target pixel; and draw a luminous-effect image corresponding to the target text based on the color transparency values corresponding to the target pixels.

17. The electronic device according to claim 13, wherein the processor, when executing the executable instructions, is further configured to:
- perform position offset on pixels in the signed distance field image of the target text to obtain a first distance field image, wherein the first distance field image comprises original pixels and offset pixels obtained after the original pixels are subjected to position offset;
- draw an initial interior-shadow-effect image corresponding to the target text based on the first distance field image;
- determine a target region composed of offset pixels, in the first distance field image, having distance field values greater than a preset value; and
- remove the target region from the initial interior-shadow-effect image to obtain an interior-shadow-effect image for the target text.

18. The electronic device according to claim 13, wherein the processor, when executing the executable instructions, is further configured to:
- determine, based on position information of pixels in the signed distance field image of the target text and a gradient-direction vector, gradient values corresponding to the pixels, wherein the gradient-direction vector represents a direction of color gradient;
- determine color values of the pixels based on the gradient values corresponding to the pixels and target gradient colors; and
- draw a color-gradient-effect image corresponding to the target text based on the color values of the pixels.

19. A non-volatile non-transitory computer-readable storage medium having instructions stored thereon, wherein the instructions, when being executed by a terminal device, cause the terminal device to implement steps of:
- determining a target closed curve in an unsigned distance field image of target text, and determining an origin corresponding to the target closed curve;
- drawing a target triangle by taking two adjacent sample points on the target closed curve and the origin as vertices according to a sampling order of the adjacent sample points, wherein the sampling order is a preset direction along the target closed curve;
- performing counting for pixels within the target triangle based on a drawing direction of the target triangle, wherein
    - the drawing direction of the target triangle is a clockwise direction or a counterclockwise direction;
    - a counting manner in a case where the drawing direction is the clockwise direction is inverse to a counting manner in a case where the drawing direction is the counterclockwise direction; and
    - the counting manners comprise increment by N per count or decrement by N per count, and N is a nonzero number;
- determining that pixels having counting results equal to 0 in the unsigned distance field image are located in an interior region of the target text, and determining that pixels having counting results not equal to 0 in the unsigned distance field image are located in the exterior region of the target text; and
- generating a signed distance field image of the target text based on the pixels located in the exterior region of the target text, the pixels located in the interior region of the target text, and the unsigned distance field image.

20. The non-volatile non-transitory computer-readable storage medium according to claim 19, wherein the instructions, when being executed by a terminal device, further cause the terminal device to implement steps of:
- obtaining a first effect distance field image;
- calculating a sum of a distance field value of a pixel in the signed distance field image of the target text and a distance field value of a pixel in the first effect distance field image located at same position coordinates as the pixel in the signed distance field image, and determining the sum as a distance field value of a pixel located at the same position coordinates in a first target distance field image; and
- drawing a first target effect image for the target text based on distance field values of pixels in the first target distance field image.

* * * * *